United States Patent
Morita et al.

(10) Patent No.: US 11,780,395 B2
(45) Date of Patent: Oct. 10, 2023

(54) AIRBAG DEVICE FOR DRIVER'S SEAT

(71) Applicants: Kazuki Morita, Kanagawa (JP);
Kazuhiro Abe, Kanagawa (JP);
Hiroyoshi Shimono, Kanagawa (JP);
Autoliv Development AB, Vargarda (SE)

(72) Inventors: Kazuki Morita, Kanagawa (JP);
Kazuhiro Abe, Kanagawa (JP);
Hiroyoshi Shimono, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 46 days.

(21) Appl. No.: 17/593,104

(22) PCT Filed: Feb. 25, 2020

(86) PCT No.: PCT/JP2020/007422
§ 371 (c)(1),
(2) Date: Sep. 9, 2021

(87) PCT Pub. No.: WO2020/184167
PCT Pub. Date: Sep. 17, 2020

(65) Prior Publication Data
US 2022/0144202 A1    May 12, 2022

(30) Foreign Application Priority Data

Mar. 13, 2019 (JP) .................................. 2019-046563
Mar. 29, 2019 (JP) .................................. 2019-067091
(Continued)

(51) Int. Cl.
*B60R 21/203*    (2006.01)
*B60R 21/215*    (2011.01)
*B60R 21/237*    (2006.01)

(52) U.S. Cl.
CPC ........ *B60R 21/2035* (2013.01); *B60R 21/215* (2013.01); *B60R 21/237* (2013.01)

(58) Field of Classification Search
CPC .......................... B60R 21/2035; B60R 21/201
See application file for complete search history.

(56) References Cited

U.S. PATENT DOCUMENTS 5,560,648 A    10/1996 Rhule et al.
5,626,358 A *   5/1997 Ricks ...................... B60R 21/23
                                                        200/61.54
(Continued)

FOREIGN PATENT DOCUMENTS

CN    1437537 A    8/2003
CN    1765660 A    5/2006
(Continued)

OTHER PUBLICATIONS

Microfilm of the specification and drawings annexed to the request of Japanese Utility Model Application No. 042135/1974,(Laid-open No. 131742/1975) (Nissan Motor Co., Ltd.) Oct. 29, 1975 (Oct. 29, 1975); p. 3, line 3 to p. 6, line 2, fig. 1-3.
(Continued)

Primary Examiner — Nicole T Verley
(74) Attorney, Agent, or Firm — Matthew D. Thayne; Thayne and Davis LLC

(57) ABSTRACT

An airbag device for a driver's seat is provided with a variant steering wheel, and an airbag module. The variant steering wheel has a module mounting surface and a cover member. When the cover member receives the expansion pressure of a cushion, a cover door opens. The airbag module includes a cloth member that is put on the cushion. A front end side of the cloth member is connected to an inflator, and a rear end is a free end. The airbag module is in a state in which the cushion is in a stored state, the cloth member is put over the cover member side of the cushion,
(Continued)

US 11,780,395 B2

Page 2 and the cloth member is held between the cover member and the cushion in the stored state.

22 Claims, 19 Drawing Sheets

(30) Foreign Application Priority Data

Jun. 6, 2019 (JP) .................................. 2019-106369
Aug. 7, 2019 (JP) .................................. 2019-145845

(56) References Cited

U.S. PATENT DOCUMENTS

| 10,173,630 | B2 * | 1/2019 | Minami | B60R 21/201 |
| 10,906,497 | B2 * | 2/2021 | Madon | B60R 21/2155 |
| 10,953,841 | B2 * | 3/2021 | Tamai | B60R 21/205 |
| 2005/0121889 | A1 * | 6/2005 | Enders | B60R 21/21656 |
| | | | | 280/731 |
| 2006/0055157 | A1 | 3/2006 | Ishiguro et al. | |
| 2008/0030008 | A1 * | 2/2008 | Zofchak | B60R 21/201 |
| | | | | 280/743.2 |
| 2008/0217892 | A1 * | 9/2008 | Maripudi | B60R 21/201 |
| | | | | 280/743.1 |
| 2009/0152842 | A1 * | 6/2009 | Benny | B60R 21/201 |
| | | | | 280/728.3 |
| 2010/0102541 | A1 * | 4/2010 | Shimizu | B60R 21/201 |
| | | | | 280/728.3 |
| 2015/0115577 | A1 * | 4/2015 | Miura | B60R 21/2334 |
| | | | | 280/728.2 |
| 2016/0355153 | A1 * | 12/2016 | Barnes | B60R 21/217 |
| 2017/0080891 | A1 * | 3/2017 | Inazumi | B60R 21/2338 |
| 2018/0037185 | A1 * | 2/2018 | Minami | B60R 21/2334 |
| 2021/0001797 | A1 * | 1/2021 | Osterfeld | B60R 21/216 |

FOREIGN PATENT DOCUMENTS

| EP | 4063201 A1 * | 9/2022 | ........... B60R 21/207 |
| JP | 07-132789 A | 5/1995 | |
| JP | 3027291 U | 5/1996 | |
| JP | 3027291 U | 8/1996 | |
| JP | 08-268198 A | 10/1996 | |
| JP | 08268198 A | 10/1996 | |
| JP | 09-301107 A | 11/1997 | |
| JP | 09301107 A | 11/1997 | |
| JP | 11-028997 A | 2/1999 | |
| JP | 11-059310 A | 3/1999 | |
| JP | 2000-062562 A | 2/2000 | |
| JP | 2001-287611 A | 10/2001 | |
| JP | 2001-334900 A | 12/2001 | |
| JP | 2001334900 A * | 12/2001 | ........... B60R 21/203 |
| JP | 2003-276546 A | 10/2003 | |
| JP | 2003-306112 A | 10/2003 | |
| JP | 2003276546 A | 10/2003 | |
| JP | 2007-076619 A | 3/2007 | |
| JP | 2007076619 A | 3/2007 | |
| JP | 2010-083439 A | 4/2010 | |
| JP | 2011-68184 A | 4/2011 | |
| JP | 2014008806 A | 1/2014 | |
| JP | 2017-024679 A | 2/2017 | |
| JP | 2017024679 A | 2/2017 | |
| JP | 2018024285 A * | 2/2018 | ........... B60R 21/201 |
| JP | 2018-122798 A | 8/2018 | |
| JP | 2018122798 A | 8/2018 | |
| WO | WO-2021033487 A1 * | 2/2021 | ......... B60R 21/2035 |
| WO | WO-2021070592 A1 * | 4/2021 | |
| WO | WO-2022080286 A1 * | 4/2022 | |

OTHER PUBLICATIONS

Japanese Patent Application No. 202080013722.4, First Office Action (9 pgs).
JP2007076619A—Machine Translation (18 pgs).
JP2018122798A—Machine Translation (17 pgs).
JP2017024679A—Machine Translation (19 pgs).
CN1765660A—Machine Translation (41 pgs).
CN1437537A—Machine Translation (44 pgs).
JP2014008806A—Machine Translation (12 pgs).
Japanese Patent Application No. 202080013722.4, First Office Action—Machine Translation (9 pgs).

* cited by examiner

[FIG. 1]
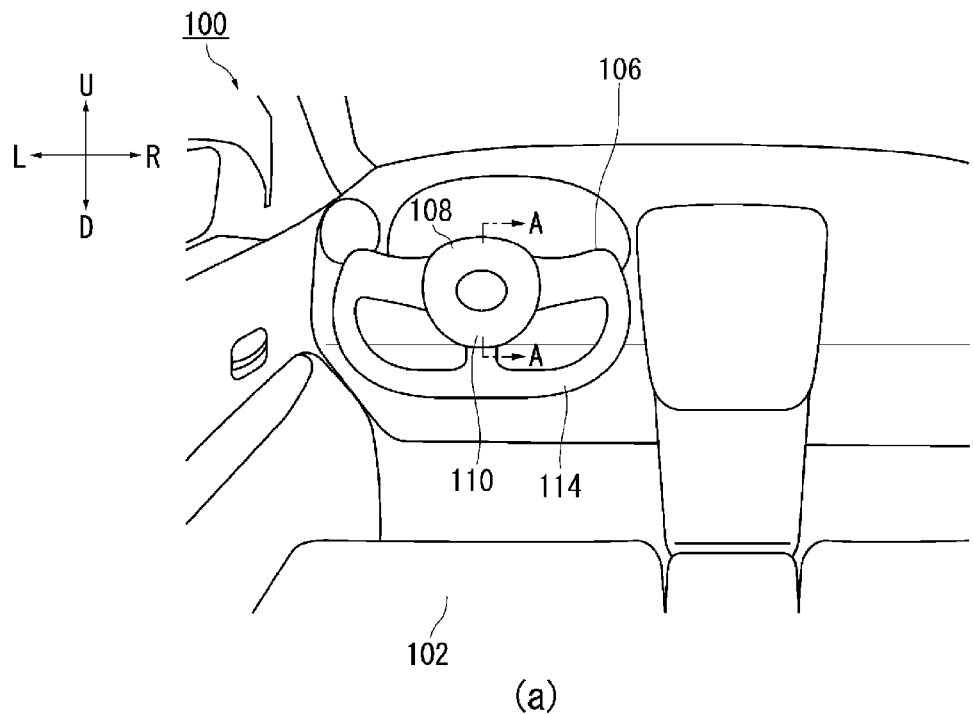
(a)
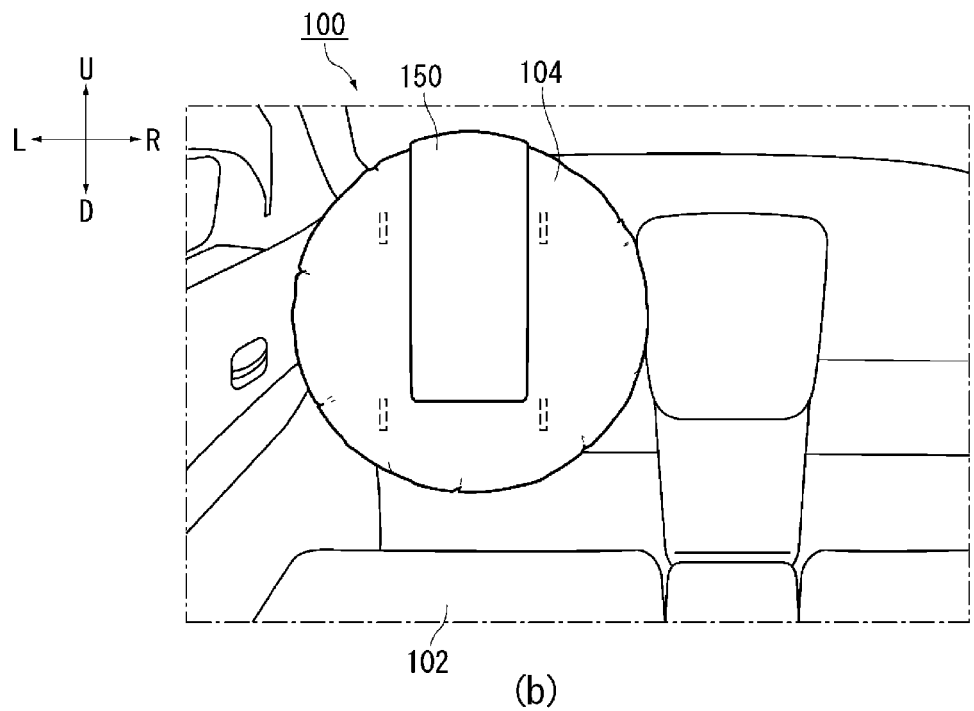
(b)

[FIG. 2]
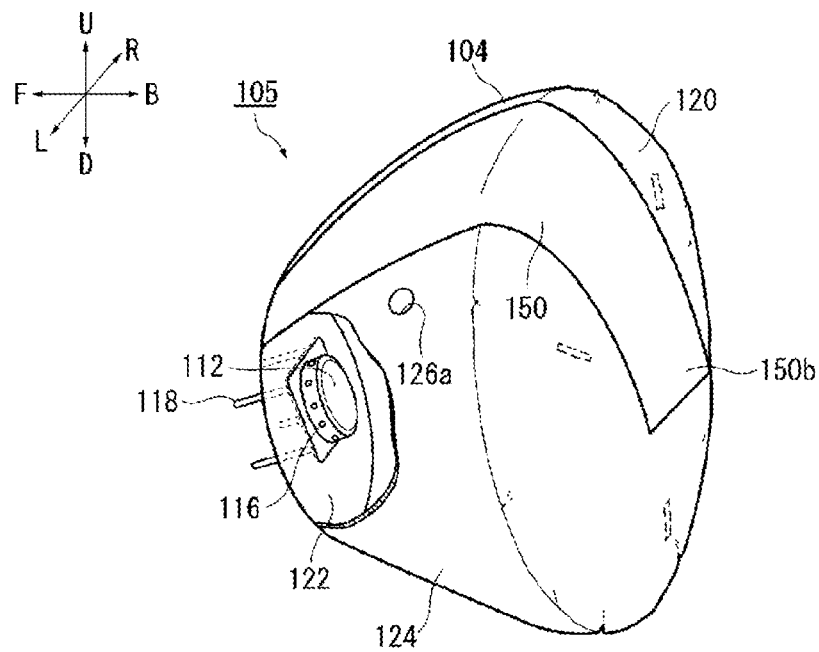
(a)
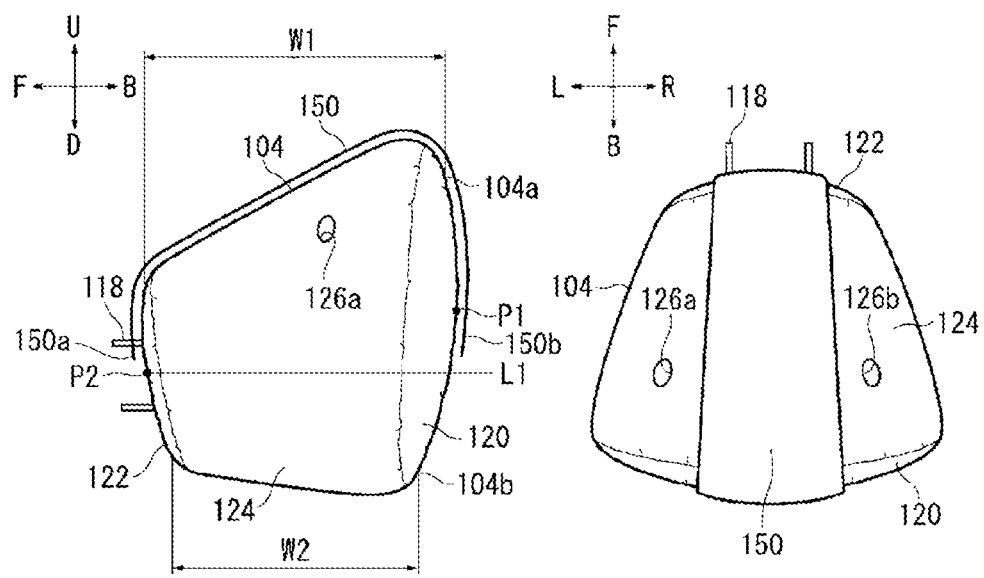
(b)
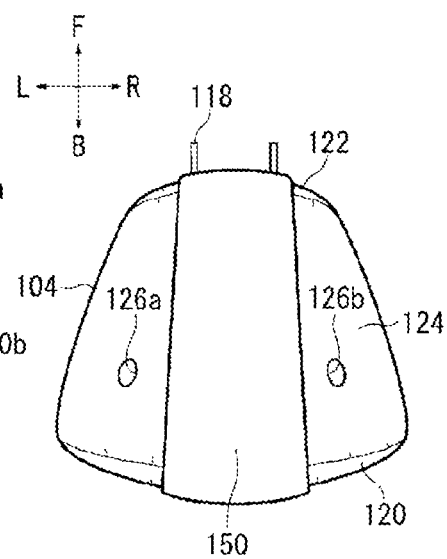
(c)

[FIG. 3]
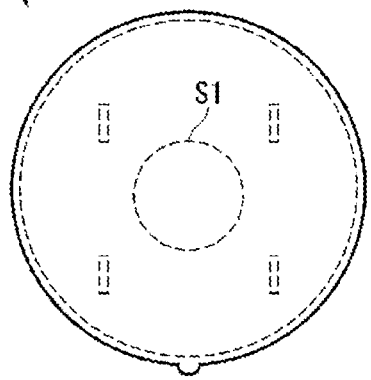
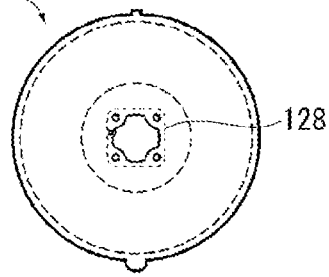

[FIG. 4]
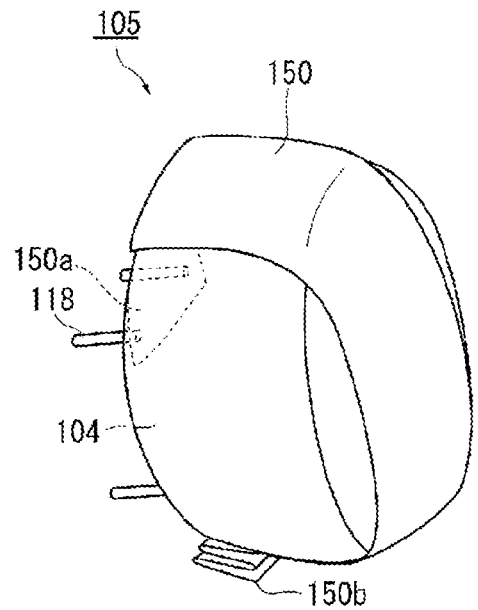
(a)
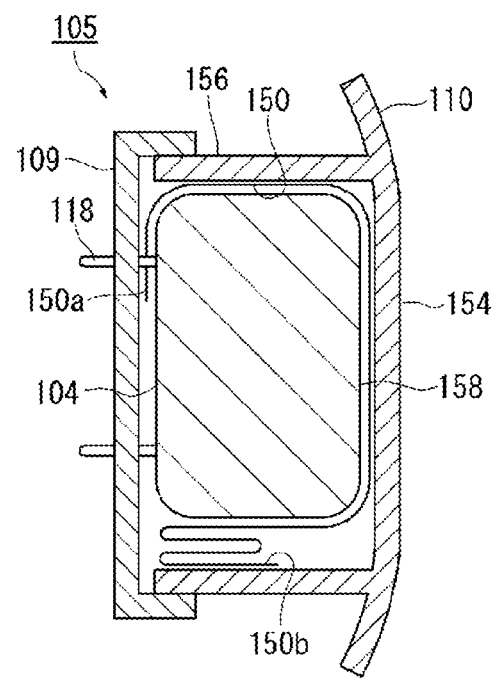
A-A
(b)

[FIG. 5]
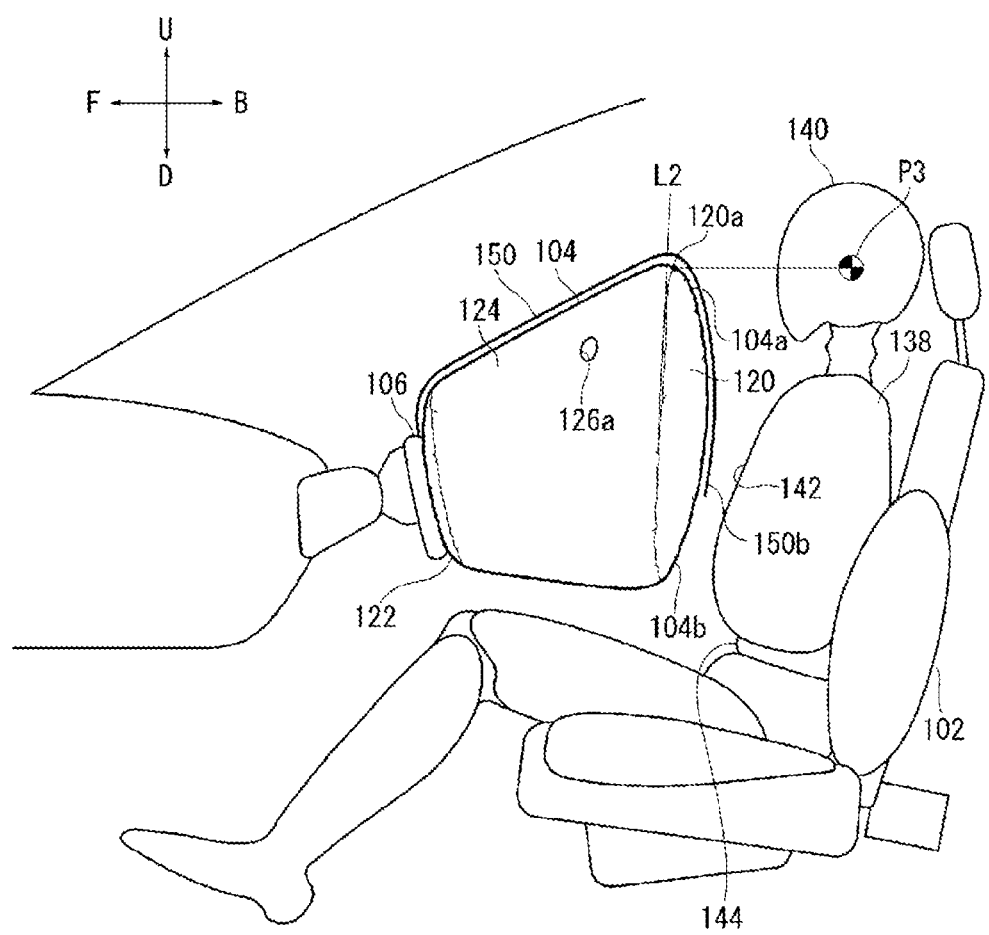

[FIG. 6]
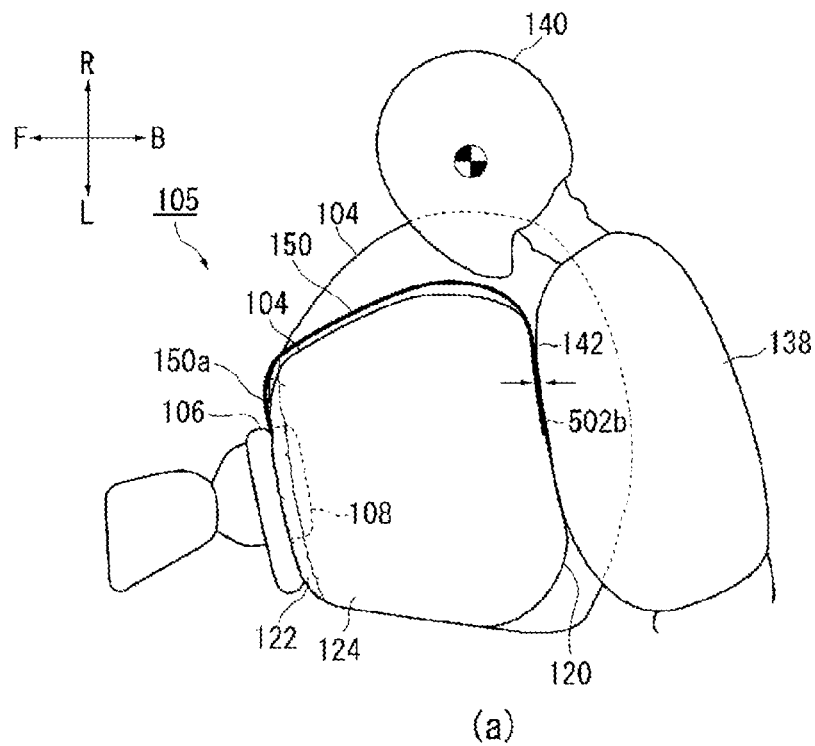
(a)
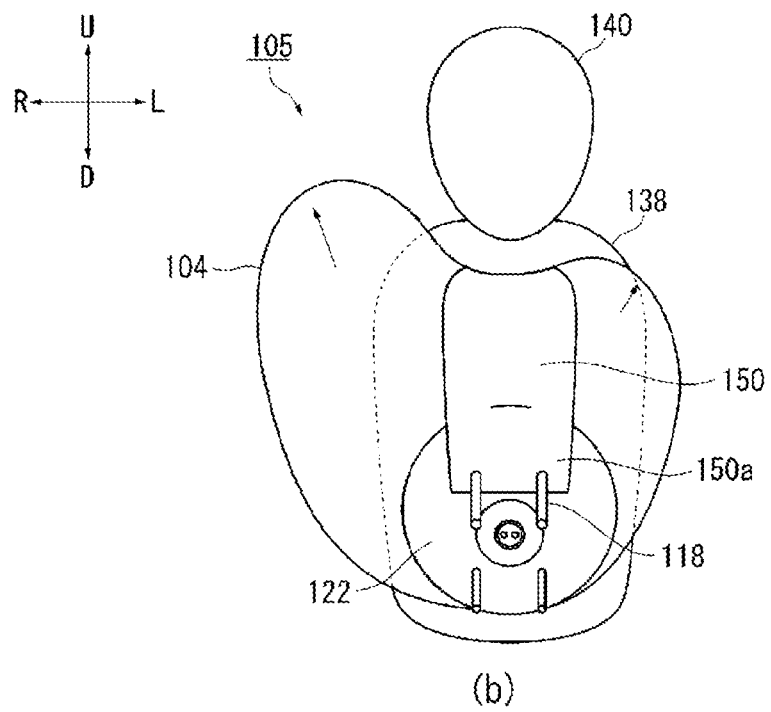
(b)

[FIG. 7]
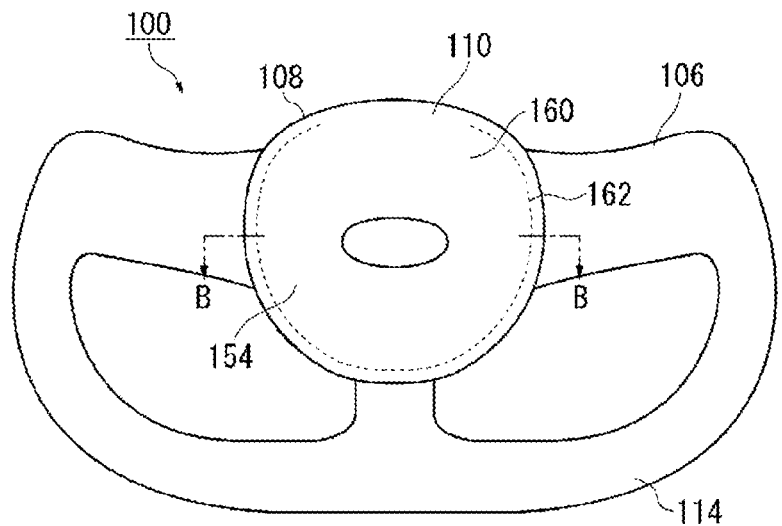
(a)
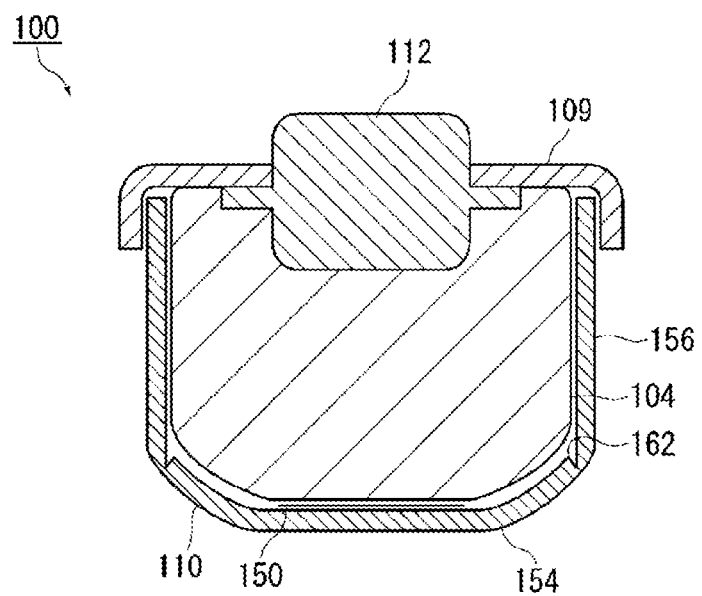
B-B
(b)

[FIG. 8]
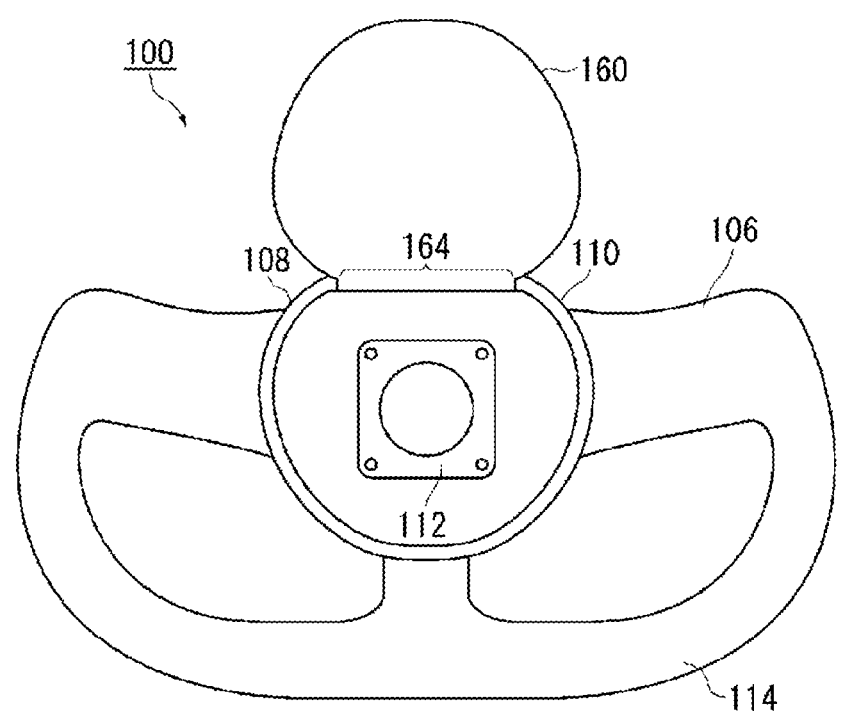

[FIG. 9]
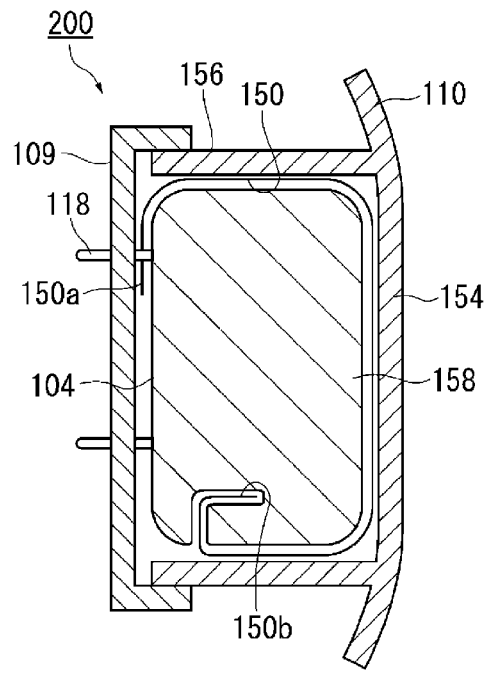
(a)
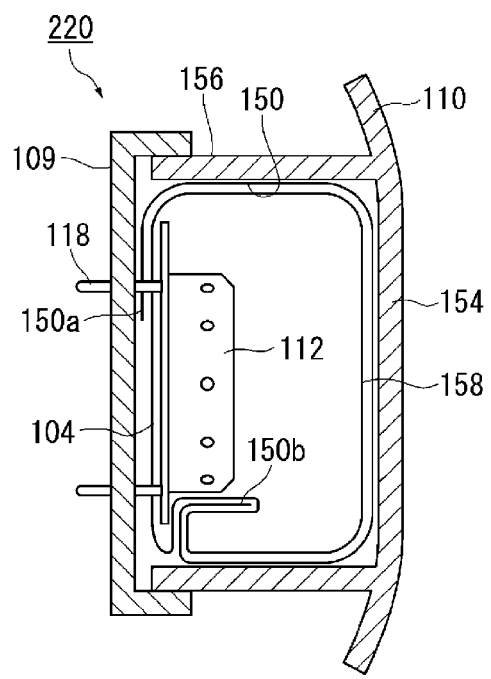
(b)

[FIG. 10]
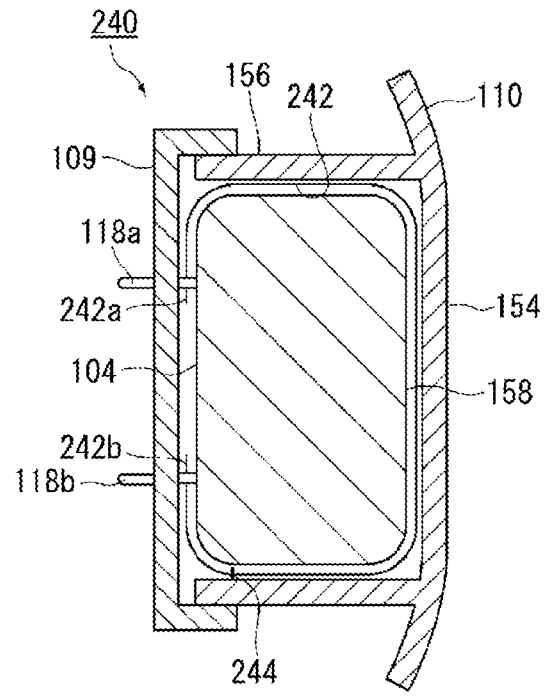
(a)
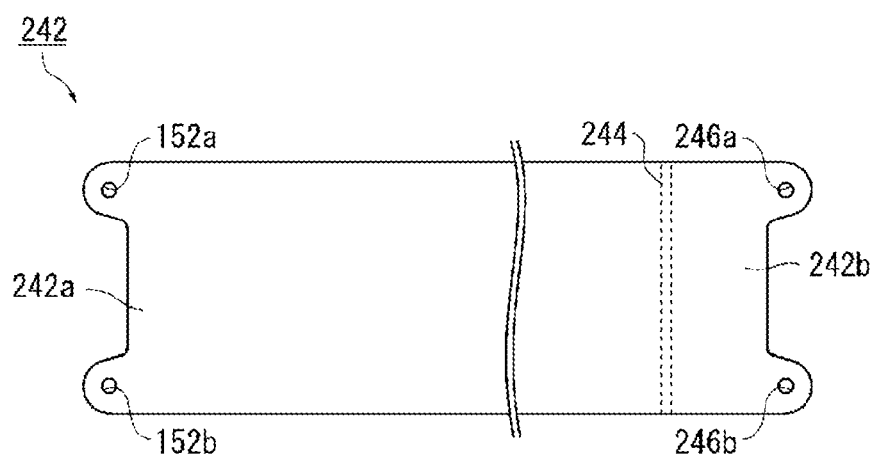
(b)

[FIG. 11]
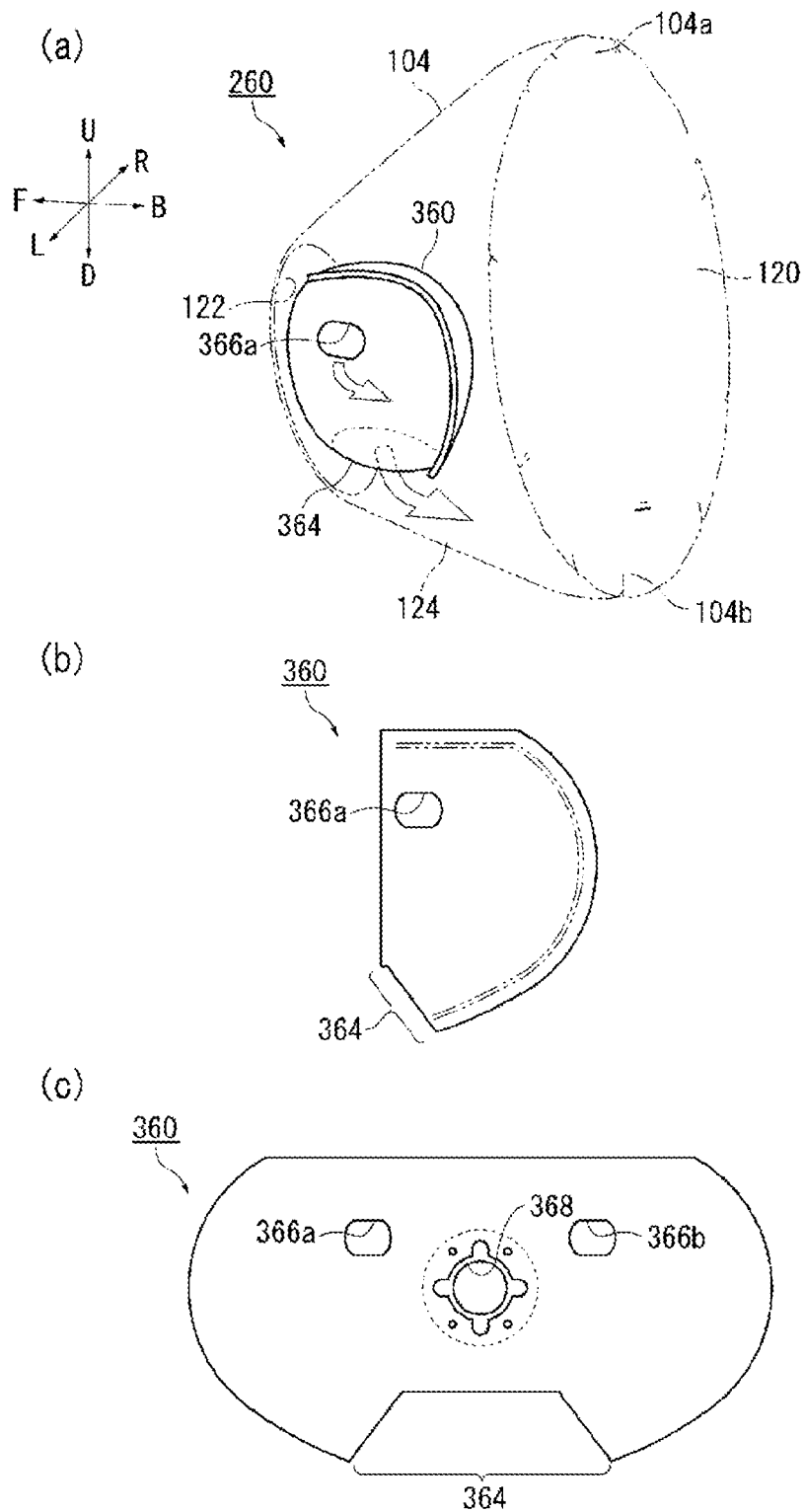

[FIG. 12]
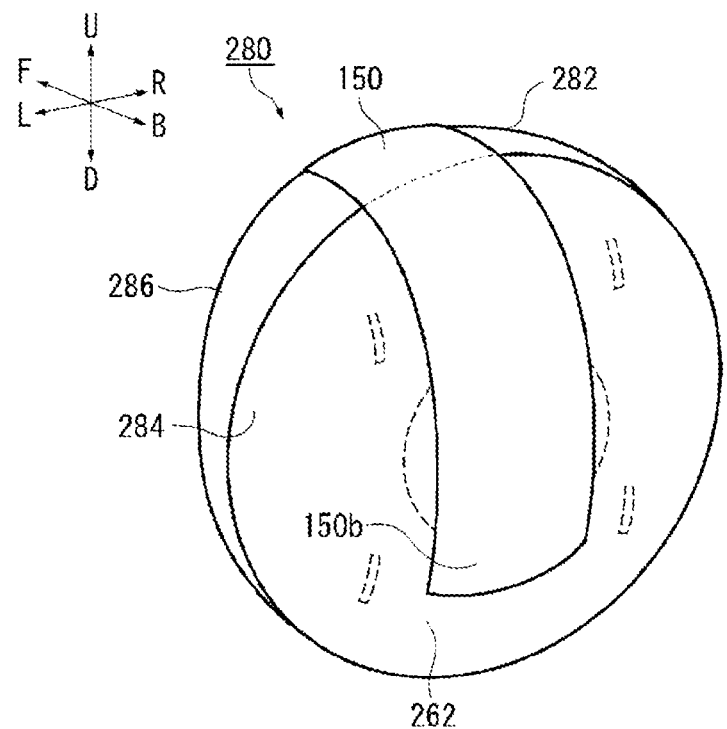
(a)
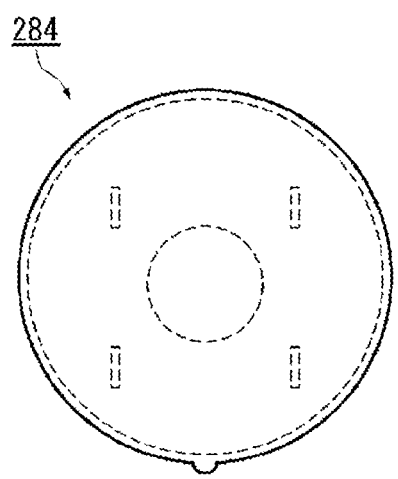
(b)
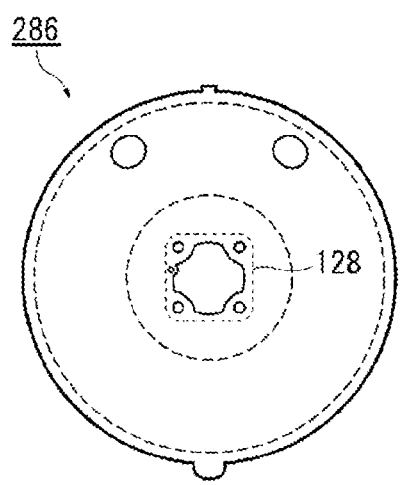
(c)

[FIG. 13]
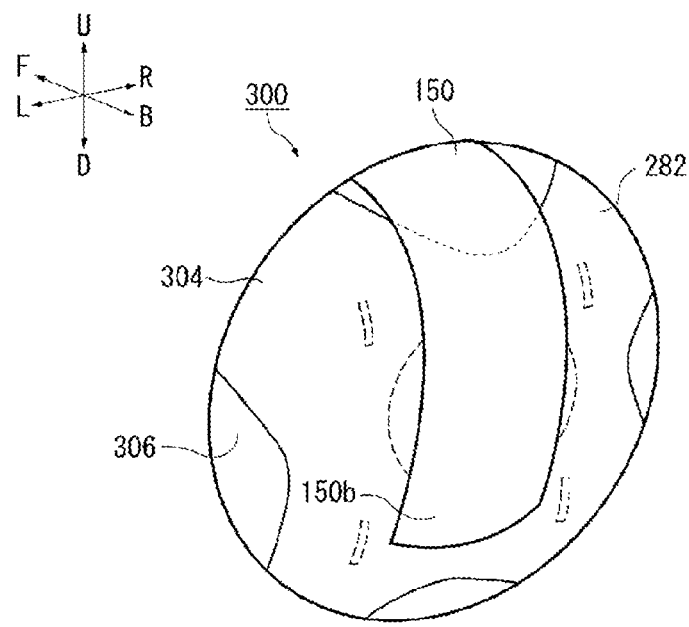
(a)
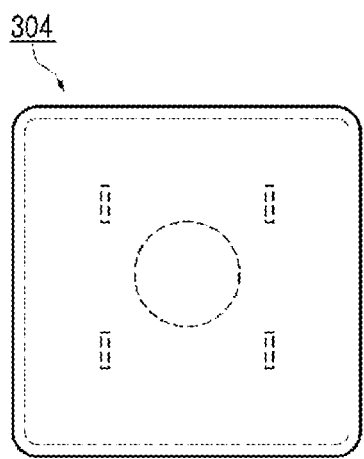
(b)
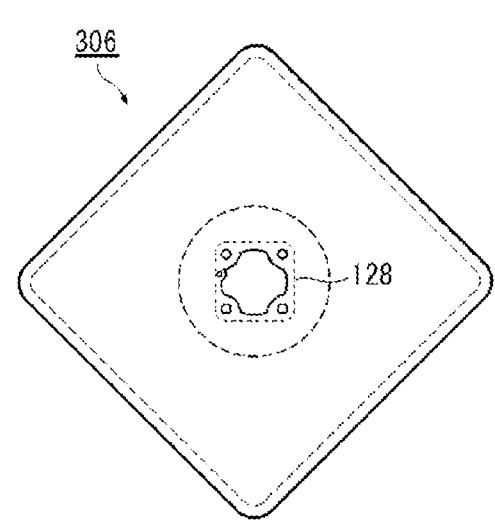
(c)

[FIG. 14]
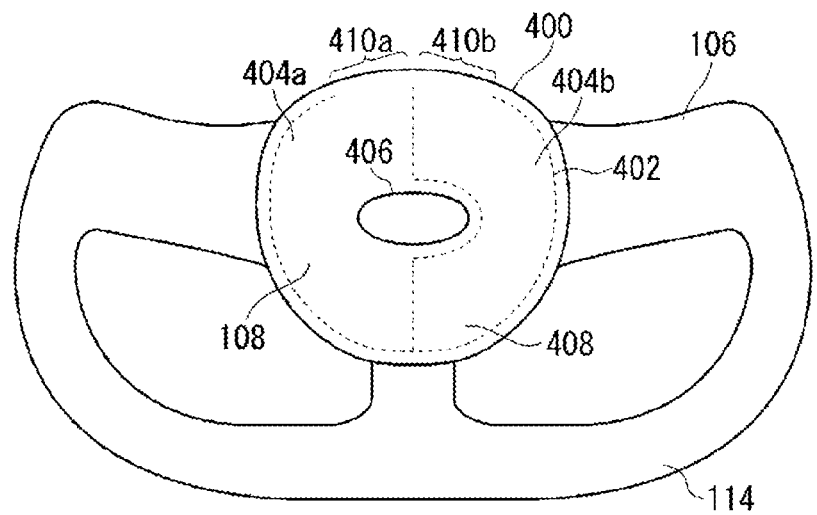
(a)
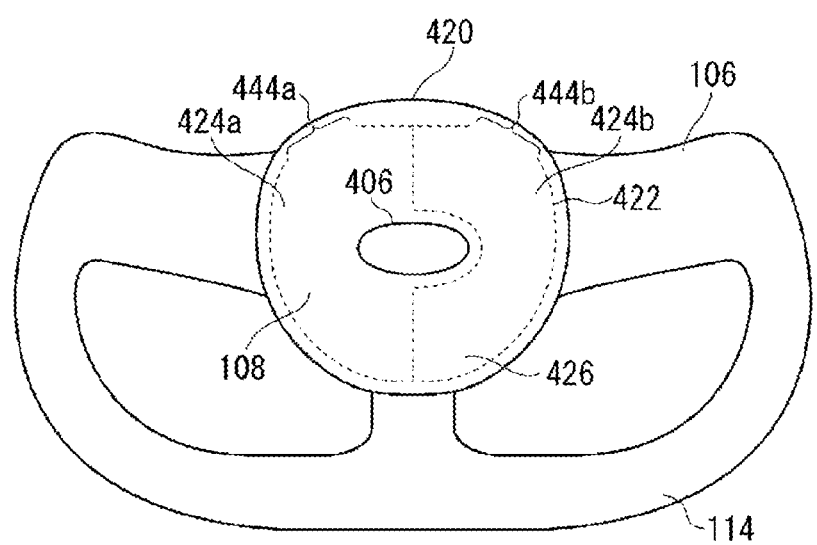
(b)

[FIG. 15]
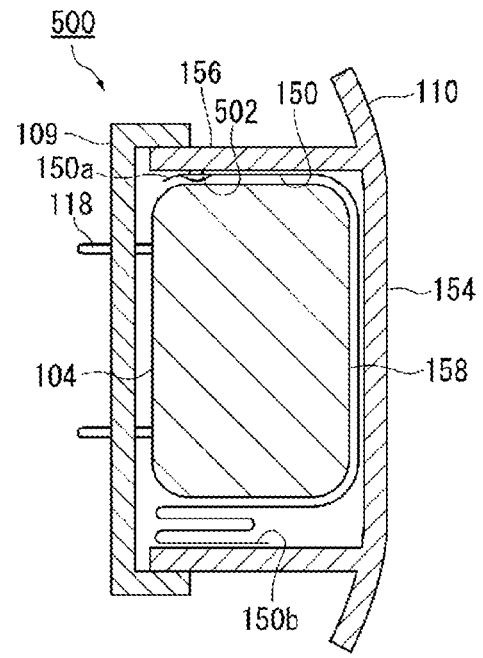
(a)
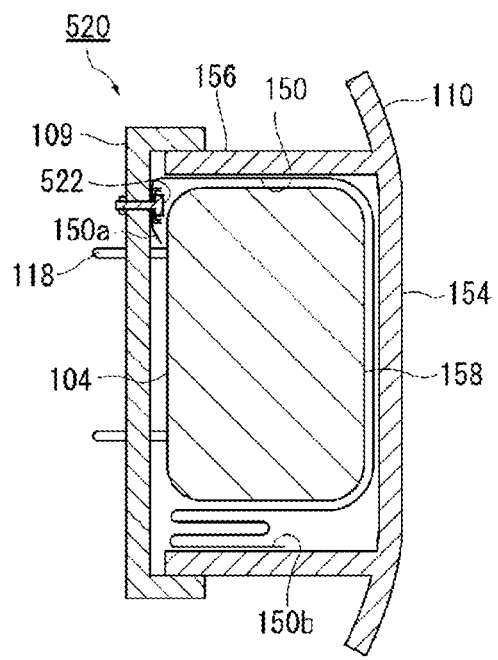
(b)

[FIG. 16]
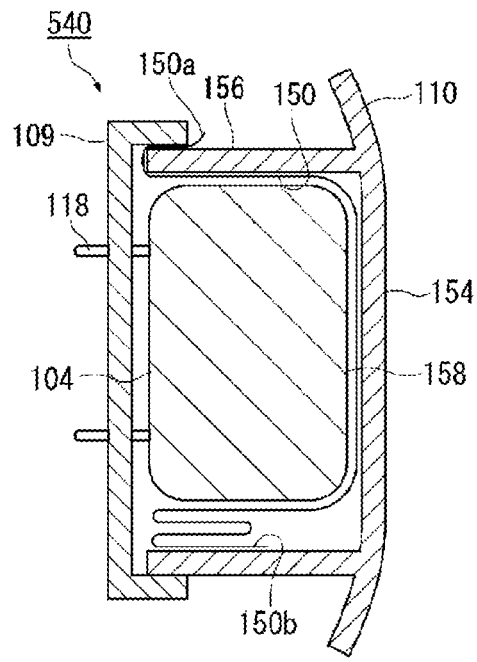
(a)
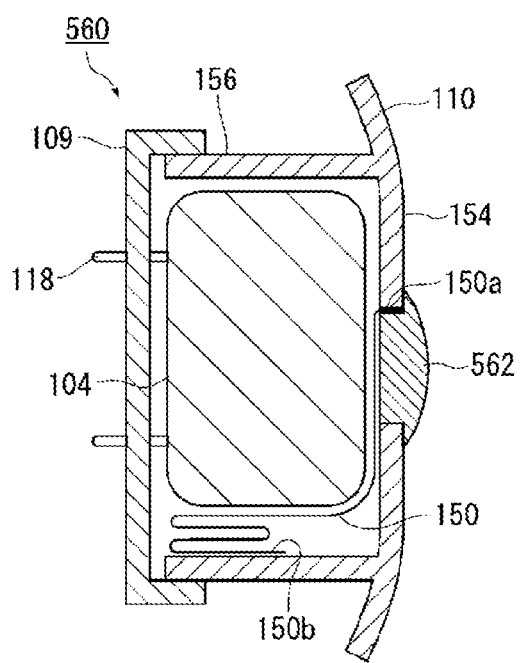
(b)

[FIG. 17]
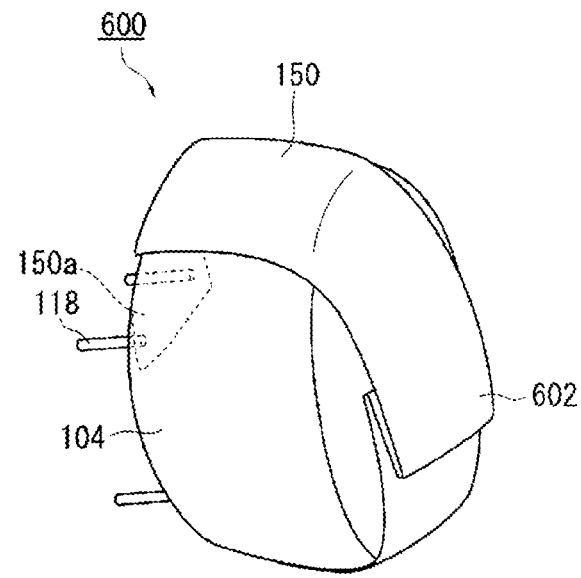
(a)
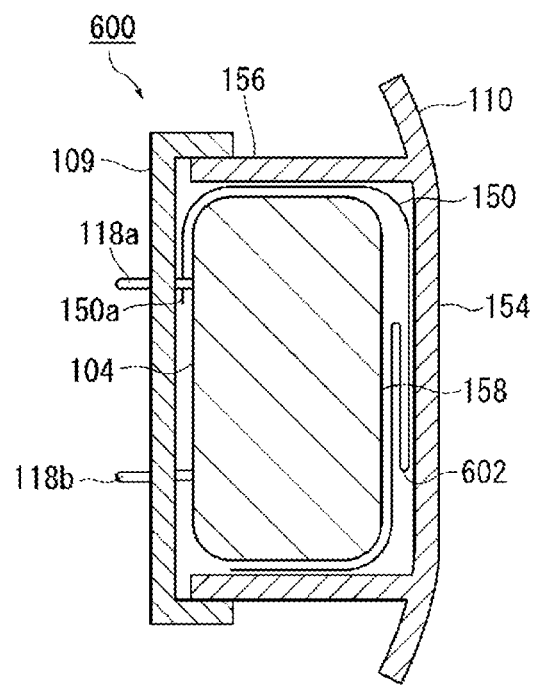
(b)

[FIG. 18]
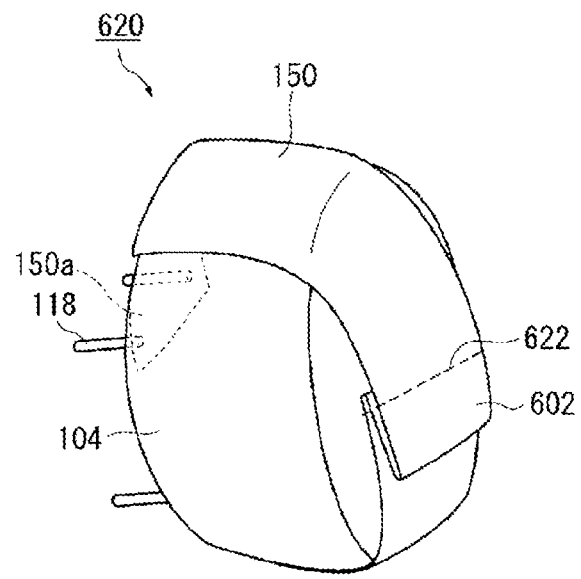
(a)
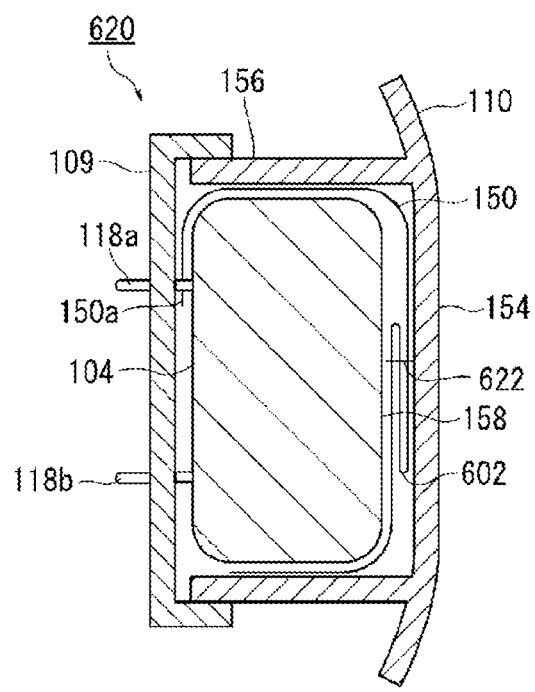
(b)

[FIG. 19]
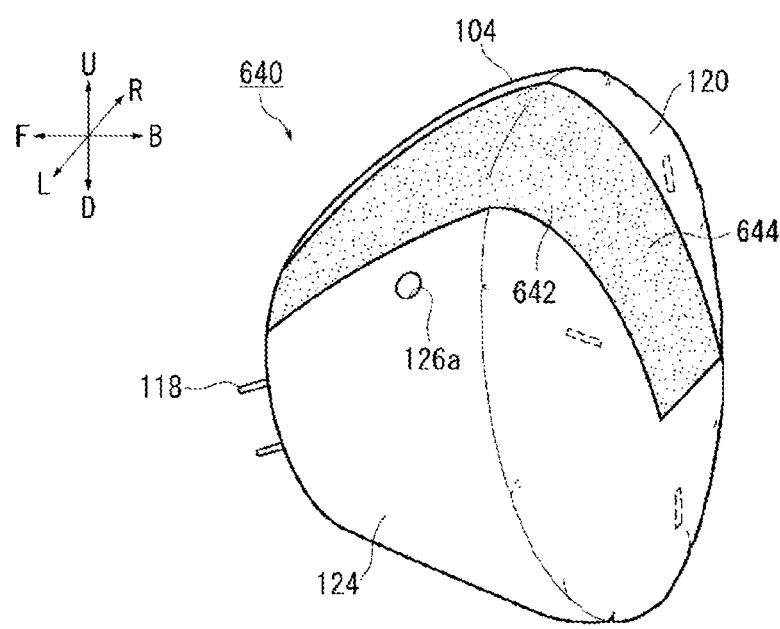
(a)
| Sample | A | B | C | D | E | F | G | H | I | J | K |
|---|---|---|---|---|---|---|---|---|---|---|---|
| Material | Base material | Base material | Base material | Base material | Base material | Base material | Base material | Base material | Base material | Base material | Base material |
| Silicon coating amount | — | — | 25 g | 50 g | 70 g | 90 g | 100 g | 120 g | 150 g | 200 g | 300 g |
| Static coefficient of friction | 0.2 | 0.3 | 0.5 | 1 | 1.5 | 2 | 3 | 4 | 6 | 8 | 10 |
| OOP Injury Value | × | × | × | ○ | ○ | ○ | ○ | ○ | ○ | ○ | ○ |
| Deployment Behavior | ○ | ○ | ○ | ○ | ○ | ○ | ○ | ○ | ○ | × | × |
(b)

AIRBAG DEVICE FOR DRIVER'S SEAT

TECHNICAL FIELD

The present invention relates to a driver's seat airbag device for restraining an occupant in an emergency.

BACKGROUND TECHNOLOGY

Currently, nearly all vehicle steering wheels are equipped with a driver's seat airbag device. The airbag cushion of the driver's seat airbag device is primarily stored in the central hub of the steering wheel, and expands and deploys in front of the occupant by opening a plastic cover member or the like by the expansion pressure thereof.

Normally, the shape of an airbag cushion is determined based on the assumption that the occupant is seated in the seat in a normal posture. However, the occupant may not always be in a normal seating position, for example, when the occupant unexpectedly leans forward. When the occupant is in a non-normal seating position relative to the seat (commonly known as out-of-position), the airbag cushion may contact the head of the occupant from below in the unlikely event of an emergency situation. In this case, the airbag cushion will cause the head of the occupant to retroflex backwards. Due to the structure of the human body, it is known that movements that rotate the head, such as retroflexing backwards, tend to place a burden on the body.

As a countermeasure for the above out-of-position, for example, in Patent Document 1, a rearwardly tilting flap 15 is provided in an airbag 10. The rearwardly tilting flap 15 is described as having the function of suppressing the rearwardly tilting moment of the head when the airbag 10 starts to expand and deploy in close proximity to the head of the occupant that is out-of-position (paragraph 0040).

PRIOR ART DOCUMENTS

Patent Documents

[Patent Document 1] Japanese Unexamined Patent Application No. 2011-68184

SUMMARY OF THE INVENTION

However, as described in FIG. 4 of Patent Document 1, the rearwardly tilting flap 15 is a long strip of material, one side of which is a free end. Therefore, the rearwardly tilting flap 15 may shift from the initially set position due to vibration or the like while stowed, or due to momentum when the airbag 10 is expanded and deployed. In order to increase the safety of the airbag 10 by means of the rearward tilting flap 15, the rearward tilting flap 15 must be properly deployed in the desired position.

Problem to be Solved by the Invention

In view of these issues, an object of the present invention is to provide a driver's seat airbag device capable of fully restraining an occupant while giving consideration to safety aspects during expansion and deployment.

Means for Solving the Problems

To solve the problems as described above, a representative configuration of the driver's seat airbag device according to the present invention is a driver's seat airbag device provided with a vehicle steering wheel and an airbag module stowed in the steering wheel containing an inflator and an airbag cushion. The steering wheel includes a module installation surface on which the airbag module is installed and a cover member that covers the airbag module installed on the module installation surface. The cover member is formed with one or a plurality of cover doors that open upon receiving expansion pressure from the airbag cushion. The airbag module further includes a cloth member that hangs on the upper portion of the airbag cushion upon expansion and deployment, which is connected on the front end side to the inflator, the vehicle front side of the airbag cushion, or a prescribed location of the steering wheel, such that the rear end of the cloth is a free end. In the airbag module, the airbag cushion is put into a stowed form, such as being wound up or folded, the cloth member is strung across the cover member side of the airbag cushion in stowed form, and the cover member is laid on top of the cloth member. In this state where the cloth member is sandwiched between the cover member and the airbag cushion in stowed form, the airbag module is installed on the module installation surface.

According to the configuration described above, when the head of the occupant is forward, the upper portion of the airbag cushion is covered with a cloth member, so that the occupant contacts the airbag cushion via the cloth member. The cloth member is then sandwiched between the occupant and the airbag cushion, making it difficult for the cloth member to move, which resists the expanding airbag cushion. This suppresses the behavior of the airbag cushion attempting to move toward the head of the occupant, or suppresses the load when the airbag cushion contacts the head, thereby preventing the head from being pushed up and retroflexed backward.

In particular, since the cloth member described above is stowed in a state pressed by the cover member from above, displacement can be prevented when subjected to vibration or the like, and when the cover door of the cover member is opened, the airbag cushion can start expanding and deploying leading with the cloth member. Accordingly, the configuration described above prevents misalignment of the cloth member both while stowed and during expansion and deployment of the airbag cushion, and enables the cloth member to be efficiently deployed to the desired position.

The cover member described above may have a design region that covers the airbag module and a wall part extending from the design region to enclose the airbag module, and one or a plurality of cover doors may be formed in the design region. With this configuration, a cover door that opens based on the expansion pressure of the airbag cushion can be suitably achieved.

The airbag module described above may be installed on the module installation surface with the rear end side of the cloth member reaching the bottom side of the airbag cushion in stowed form and folded between the airbag cushion and the wall part of the cover member. This configuration prevents misalignment of the cloth member while stowed and enables the cloth member to be efficiently deployed in the desired position.

The airbag module described above may be installed on the module installation surface with the rear end side of the cloth member reaching the bottom side of the airbag cushion in stowed form and wound or folded together with the airbag cushion. This configuration also prevents misalignment of the cloth member while stowed and enables the cloth member to be efficiently deployed in a desired position.

The airbag module described above may be installed on the module installation surface with a midway location of the cloth member folded between the airbag cushion and the design region of the cover member. According to this configuration, the dimensions of the cloth member while stowed can be suppressed while preventing the cloth member from being displaced while stowed.

The airbag module described above may have a temporary fastening part that temporarily fastens the folded portion of the cloth member, and the temporary fastening part may be release-able by expansion pressure of the airbag cushion. With this configuration, the cloth member can be reduced in size and prevented from being misaligned while stowed, while the cloth member can be smoothly deployed during expansion and deployment of the airbag cushion by releasing the temporary fastening part.

The temporary fastening part described above may be sewn in such a way as to enable being ruptured by the expansion pressure of the airbag cushion. According to this configuration, the temporary fastening part can be suitably released in accordance with the expansion and deployment of the airbag cushion.

To solve the problems as described above, a representative configuration of the driver's seat airbag device according to the present invention is a driver's seat airbag device provided with a vehicle steering wheel and an airbag module stowed in the steering wheel containing an inflator and an airbag cushion. The steering wheel includes a module installation surface on which the airbag module is installed and a cover member that covers the airbag module installed on the module installation surface. The cover member is formed with one or a plurality of cover doors that open upon receiving expansion pressure from the airbag cushion. The airbag module further includes a cloth member in the airbag module, when the airbag cushion is put into a stowed form, such as being wound up or folded, the cloth member is suspended across the cover member side of the airbag cushion in stowed form, and the cover member is laid on top of the cloth member. In this state where the cloth member is sandwiched between the cover member and the airbag cushion in stowed form, the airbag module is installed on the module installation surface. Regarding the cloth member, the first end side is connected to the inflator, the vehicle front side of the airbag cushion, or a prescribed location on the steering wheel, and the second end side crosses from the first end side over the cover member side of the airbag cushion in stowed form and is connected to the vehicle front side of the inflator or the airbag cushion. In addition, a prescribed location on the second end side of the cloth member is formed with an engaging part that can be released upon expansion pressure from the airbag cushion or a fragile part that can be broken upon expansion pressure from the airbag cushion.

Even according to the configuration described above, when the head of the occupant is forward, the upper portion of the airbag cushion is covered with a cloth member so that the occupant contacts the airbag cushion via the cloth member. The cloth member is then sandwiched between the occupant and the airbag cushion, making it difficult for the cloth member to move, which resists the expanding airbag cushion. This suppresses the behavior of the airbag cushion attempting to move toward the head of the occupant, or suppresses the load when the airbag cushion contacts the head, thereby preventing the head from being pushed up and retroflexed backward.

In particular, since the cloth member described above is stowed in a state pressed by the cover member from above, displacement can be prevented when subjected to vibration or the like, and when the cover door of the cover member is opened, the airbag cushion can start expanding and deploying leading with the cloth member. Furthermore, the cloth member is configured to deploy when the airbag cushion expands and deploys based on releasing of the engaging part or breaking the fragile part, thus efficiently preventing misalignment while stowed.

The cover member described above may have a design region that covers the airbag module and a wall part extending from the design region to enclose the airbag module, and one or a plurality of cover doors may be formed in the design region. With this configuration, a cover door that opens based on the expansion pressure of the airbag cushion can be suitably achieved.

The prescribed location of the steering wheel described above may include the wall part of the cover member. This configuration also allows a cloth member to be applied to the upper portion of the expanding and deploying airbag cushion.

The prescribed location on the steering wheel as described above can include the module installation surface. This configuration also allows a cloth member to be applied to the upper portion of the expanding and deploying airbag cushion.

The prescribed location of the steering wheel described above may include a location between the cover member and the portion adjacent to the cover member, and the front end side of the cloth member may be sandwiched between the above portions. This configuration also allows a cloth member to be applied to the upper portion of the expanding and deploying airbag cushion.

The one or plurality of cover doors described above may open upwardly, and the prescribed location of the steering wheel may include an area of the design region that is at or above the cover doors. This configuration also allows a cloth member to be applied to the upper portion of the expanding and deploying airbag cushion.

The one or plurality of cover doors described above may open upwardly. A cover door that opens upward provides a downward reaction force to the airbag cushion, thereby suppressing the deployment behavior of the airbag cushion that attempts to move toward the head of the occupant.

The airbag cushion described above may have a restraining surface capable of restraining the chest of the occupant, and the cloth member may be applied over the restraining surface from the top of the expanding and deploying airbag cushion. With this configuration, when the airbag cushion is expanded and deployed, the cloth member is sandwiched between the chest of the occupant and the airbag cushion, making it difficult for the cloth member to move. This allows the cloth member to resist the airbag cushion attempting to expand, and to suppress the behavior of the airbag cushion attempting to move toward the head of the occupant.

The upper portion of the expanded and deployed airbag cushion described above may be thicker in the vehicle front-rear direction than the lower portion of the airbag cushion. With this configuration, the upper portion of the airbag cushion can restrain the head of the occupant with the thickness thereof, and the lower portion can easily enter the narrow space between the steering wheel and the abdomen of the occupant. In particular, the lower portion of the airbag cushion is sandwiched between the steering wheel and the abdomen. Therefore, the shape of the airbag cushion is less likely to collapse, and the head restraining performance by the upper portion can also be improved.

A portion of the inflator described above may be inserted into the airbag cushion, a portion of the inflator may have a prescribed gas discharge port, the airbag cushion may have a rectifying cloth covering a portion of the inserted inflator, and the rectifying cloth may have an opening below a portion of the inflator.

The flow-regulating material described above allows gas supplied from the inflator to flow downward through the opening part, and thus the airbag cushion can expand from a lower portion side. Thus, the airbag cushion can quickly enter the space between the steering wheel and the abdomen of the occupant.

The airbag cushion in stowed form as described above may have a portion, which is centered on the occupant side when expanded and deployed, contact the cover member over the cloth member. According to this configuration, the airbag cushion can be efficiently expanded and deployed leading with the cloth member and the portion that is centered on the occupant side as the leading portion.

The airbag cushion in stowed form described above may be wound or folded radially from the periphery to the apex and contracted, with the apex being the center portion on the occupant side. According to this configuration, the portion of the airbag cushion that is centered on the occupant side can be efficiently positioned on the cover member side.

The steering wheel described above has a hub including a module installation surface and a cover member, and a rim to be grasped by an occupant, wherein the rim may have a shape in which an upper extent of the hub is partially omitted or in which a part located above the hub is closer to the hub side than a part located on either side of the hub.

Many new steering wheels that have been developed in recent years are not in conventional circular shape, and various designs exist, such as rims that exist only on the left and right sides of the hub, or rims in which the upper part of the hub is shaped closer to the hub side. These non-circular shaped steering wheels (variant steering wheels) do not have a part of the rim that is above the hub, or the dimensions of the upper part of the rim are omitted, and the like, enabling heads of occupants to travel further forward than with conventional steering wheels. Thus, in the unlikely event of an emergency situation when the occupant is in a non-normal seating position relative to the seat (commonly known as out-of-position), such as when the head of the occupant is forward, the airbag cushion may expand and deploy from below relative to the head of the occupant. In such a case, a conventional airbag cushion may push the head of the occupant up and cause the head to retroflex backward, which may cause physical strain. Therefore, installing an airbag module equipped with the cloth member described above in the variant steering wheel enables suitably utilizing the effect of the cloth member in reducing the burden on the occupant.

The cloth member described above may have a coefficient of static friction of the surface on the occupant side that is greater than the coefficient of static friction of the surface on the airbag cushion side. According to this configuration, the static frictional force between the cloth member and the occupant is increased, thus preventing the cloth member from slipping off the occupant and enabling the airbag cushion to fully restrain the occupant while allowing the cloth member to function suitably.

The cloth member described above may be coated with a prescribed resin on the occupant side surface. This configuration enables increasing the static frictional force between the cloth member and the occupant.

Effect of the Invention

According to the present invention, a driver's seat airbag device capable of fully restraining an occupant while giving consideration to safety aspects during expansion and deployment can be provided.

BRIEF DESCRIPTION OF THE DRAWINGS

FIG. 1 is a diagram illustrating an overview of a driver's seat airbag device in accordance with an embodiment of the present invention.
FIG. 2 is a diagram illustrating a cushion in FIG. 1(b) from each direction during expansion and deployment.
FIG. 3 is a diagram illustrating each panel configuring a cushion in FIG. 2(a).
FIG. 4 is a diagram illustrating the airbag module in FIG. 2(a) in stowed form.
FIG. 5 is a diagram illustrating the cushion in FIG. 2(b) and an occupant in a normal seating position.
FIG. 6 is a diagram illustrating the cushion in FIG. 5 and an occupant in a non-normal seating position.
FIG. 7 is a diagram illustrating the variant steering wheel in FIG. 1(a) from each direction.
FIG. 8 is a diagram illustrating the cover member in FIG. 7(a) in a forced open state.
FIG. 9 is a diagram illustrating first and second modified examples of the airbag module in FIG. 4(b)
FIG. 10 is a diagram illustrating a third modified example of the airbag module in FIG. 4(b).
FIG. 11 is a diagram illustrating a fourth modified example of the airbag module in FIG. 2(a).
FIG. 12 is a diagram illustrating a fifth modified example of the airbag module in FIG. 2(a).
FIG. 13 is a diagram illustrating a sixth modified example of the airbag module in FIG. 2(a).
FIG. 14 is a diagram illustrating first and second modified examples of the cover member in FIG. 7(a).
FIG. 15 is a diagram illustrating 7th and 8th modified examples of the airbag module in FIG. 4(b).
FIG. 16 is a diagram illustrating ninth and tenth modified examples of the airbag module in FIG. 4(b).
FIG. 17 is a diagram illustrating an eleventh modified example of the airbag module in FIG. 4.
FIG. 18 is a diagram illustrating a twelfth modified example of the airbag module in FIG. 4.
FIG. 19 is a diagram illustrating a thirteenth modified example of the airbag module in FIG. 2(a).

DESCRIPTION OF CODES

L1: Hidden line extending from the center of the rear panel
L2: Boundary between side panel and front panel
P1: Center of front panel
P2: Center in vertical direction of rear panel
P3: Center of gravity of head
W1: Width of upper portion of cushion
W2: Width of lower portion of cushion
100: Driver's seat airbag device
102: Seat
104: Cushion
104a: Upper portion of the cushion
104b: Lower portion of the cushion
105: Airbag module
106: Variant steering wheel
108: Hub
109: Module installation surface 110: Cover member
112: Inflator
114: Rim
116: Gas discharge port
118, 118a, 118b: Stud bolts
120: Front panel
122: Rear panel
124: Side panel
126a, 126b: Vent holes
128: Fixed region
130: Large diameter side arc
132: Small diameter side arc
134a, 134b: Longitudinal end parts of the side panels
138: Occupant
142: Chest
144: Abdomen
150: Cloth member
150a: Front end side
150b: Rear end side
152a, 152b: Holes
154: Design region
156: Wall part
158: Apex
160: Cover door
162: Groove part
164: Hinge
200: Airbag module of the first modified example
220: Airbag module of the second modified example
240: Airbag module of the third airbag module
242: Cloth member
242a: First end side
242b: Second end side
244: Fragile part
246a, 246b: Holes
260: Airbag module of the fourth modified example
280: Airbag module of the fifth modified example
282: Cushion
284: Front panel
286: Rear panel
300: Airbag module of the sixth modified example
302: Cushion
304: Front panel
306: Rear panel
360: Rectifying cloth
364: Opening part
366a, 366b: Exhaust ports
368: Insertion port
400: Cover member of the first modified example
402: Groove part
404a, 404b: Cover doors
408: Design region
410a, 410b: Hinges
420: Cover member of the second modified example
422: Groove part
424a, 424b: Cover doors
426: Design region
500: Airbag module of the seventh modified example
502: Rivet
520: Airbag module of the eighth modified example
522: Bracket
540: Airbag module of the ninth modified example
560: Airbag module of the tenth modified example
562: Emblem
600: Airbag module of the eleventh modified example
602: Folding part
620: Airbag module of the twelfth modified example
622: Temporary fastening part 640: Airbag module
642: Cloth member
644: Resin coated surface

MODE FOR CARRYING OUT THE INVENTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating an overview of a driver's seat airbag device 100 according to an embodiment of the present invention. FIG. 1(a) is a diagram illustrating a vehicle before activation of the driver's seat airbag device 100. Hereinafter, regarding FIG. 1 and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The driver's seat airbag device 100 is applied in the present embodiment as the driver airbag for the driver's seat for vehicles with a steering wheel on a left side (front row left side seat 102). Hereinafter, explanations are made assuming the front row left side seat 102, for example, a vehicle outer side in the vehicle width direction (hereinafter, outer vehicle side) refers to a left side of the vehicle, and a vehicle inner side in the vehicle width direction (hereinafter, vehicle inner side) refers to a right side of the vehicle.

The airbag cushion (hereinafter referred to as the cushion 104 (see FIG. 1(b)) of the driver's seat airbag device 100 is stowed, folded, wound, or the like, in front of the seating position of the seat 102, inside a central hub 108 of the steering wheel (variant steering wheel 106 described below). At this time, the cushion 104 is stowed together with an inflator 112 (see FIG. 2(a)) that supplies the gas, forming an airbag module 105 (see FIG. 2(a)). The hub 108 includes a surface cover member 110 and a module installation surface 109 (see FIG. 4(b)) and the like.

The variant steering wheel 106 on which the cushion 104 is installed in the present embodiment is assumed to be of a configuration in which an operation of the occupant is converted into an electrical signal and transmitted to the wheel. The variant steering wheel 106 has a rim 114 of a shape other than a circular ring, and is different in shape from a conventional steering wheel with a circular rim. The rim 114 is a part to be grasped by the occupant, and accepts operations causing rotation around the central hub 108, but unlike conventional circular rims, operations to rotate the rim at a large angle are not necessary, so there is no need to pass the rim between the left and right hands. As a result, the rim 114 is shaped to be present only on the left, right and lower sides the hub 108, and the area above the hub 108 being partially omitted.

The variant steering wheel 106 is an example of one having a shape in which a portion of the upper area of the hub 108 is omitted. Other examples of variant steering wheels 106 can include a shape in which the portion located above the hub is closer to the hub side than the portion located to the left or right of the hub, or a rim (grip) that is present only on the left or right side of the hub.

The upper side of the hub 108 means the side above the straight line connecting 3 o'clock and 9 o'clock in the case where the variant steering wheel 106 is regarded as a clock and the axis of the hands of the clock is located at the center of the hub 108. The upper portion of the variant steering wheel 106 may be installed tilted toward the front of the vehicle. As a result, the vertical direction of the variant steering wheel 106 is the direction connecting 12 o'clock and 6 o'clock when the variant steering wheel 106 is viewed as a clock, which may not match the actual vertical direction. The left and right directions of the variant steering wheel 106 are the 3 o'clock or 9 o'clock directions when the variant steering wheel 106 is viewed as a clock.

FIG. 1(b) is a diagram illustrating a vehicle after the cushion 104 of the driver's seat airbag device 100 expands and deploys. The cushion 104 begins to expand while a cover 110 (see FIG. 1(a)) is forced open by gas from an inflator 112 (see FIG. 2(a)), and expands and deploys into a bag shape in front of the seating position of the seat 102 to restrain the upper body and head of the occupant from moving forward. The cushion 104 has a circular shape as viewed from the seating position side, and is formed by overlaying a plurality of panels that form the surface thereof and then stitching or adhering. The cushion 104 is covered with a cloth member 150 as a member unique to the driver's seat airbag device 100. The cloth member 150 has the function of preventing the head of the occupant from retroflexing backward (see FIG. 6).

FIG. 2 is a diagram illustrating a cushion 104 in FIG. 1(b) from each direction during expansion and deployment. FIG. 2(a) illustrates the cushion 104 in FIG. 1(b) seen from slightly above the vehicle outer side. In FIG. 2(a), a portion of the panel configuring the cushion 104 is cut out to expose the internal inflator 112.

The cushion 104 in the present embodiment has a shape similar to a truncated cone, with the diameter widening from the variant steering wheel 106 side (see FIG. 1(a)) toward the occupant side (vehicle rear side).

The cloth member 150 is in the form of a band in the present embodiment, and is passed over the upper portion of the expanded and deployed cushion 104 in the vehicle front-rear direction. The cloth member 150 has a front end side 150a (see FIG. 2(b)) connected to stud bolts 118 of the inflator 112, and a rear end side 150b is a free end. The cloth member 150 can be formed from a base fabric of the same material as the cushion 104, but can also be formed from other fabric-like materials.

The inflator 112 is a device for supplying gas, and in the present embodiment, a disk type is used. The inflator 112, where a portion thereof formed with a gas discharge port 116 is inserted into the cushion 104 through a rear panel 122, is activated based on an impact detection signal transmitted from a sensor (not shown) to supply gas to the cushion 104. The inflator 112 is provided with a plurality of stud bolts 118. The stud bolts 118 pass through the rear panel 122 of the cushion 104 and is fastened to the module installation surface 109 (see FIG. 4(b)) of the variant steering wheel 106. The cushion 104 is also secured to the interior of the hub 108 by the fastening the stud bolts 118.

Note that examples of currently prevailing inflators include: types filled with a gas generating agent and that burns the agent to generate a gas; types filled with a compressed gas and supplies the gas without generating heat; hybrid types that utilize both a combustion gas and a compressed gas; and the like. Any of these types of inflators can be used as the inflator 112.

FIG. 2(b) is a diagram illustrating the cushion 104 of FIG. 2(a) from a left side in the vehicle width direction. The cushion 104 is formed from a plurality of panels and includes a front panel 120 located on the occupant side, a rear panel 122 located on the variant steering wheel 106 side (see FIG. 1(a)), and side panels 124 connecting the front panel 120 and the rear panel 122 to form the side portions of the cushion 104.

The expanded and deployed cushion 104 is shaped along a truncated cone, but is generally slightly inclined. Specifically, the shape is inclined such that a center P1 of the front panel 120 in a height direction is positioned above an imaginary line L1 horizontally extended from a center P2 of the rear panel 122 in the height direction. When the cushion 104 is expanded and deployed, the front panel 120 is arranged to extend substantially vertically, while the rear panel 122 is arranged so that the upper portion thereof is inclined to collapse to the vehicle front side (left side in FIG. 2(b)). As a result, in the vehicle front-rear direction, the width W1 of an upper portion 104a of the expanded and deployed cushion 104 is thicker than the width W2 of a lower portion 104b of the cushion 104.

FIG. 2(c) is a diagram illustrating the cushion 104 of FIG. 2(a) from above. The cushion 104 is in the shape of an essentially symmetrical truncated cone when viewed from above. The cloth member 150 is configured to be passed over the upper end surface of the cushion 104 in the center of the vehicle width direction in the vehicle front-rear direction.

FIG. 3 is a diagram illustrating each panel configuring the cushion 104 in FIG. 2(a). In FIG. 3, each panel is illustrated in a state spread out on a plane. FIG. 3(a) is a diagram illustrating the front panel 120 of FIG. 2(b). The front panel 120 is circular and expands in front of the upper body of an occupant seated in the driver's seat when the cushion 104 is expanded and deployed, forming an occupant restraining surface to restrain the occupant.

FIG. 3(b) is a diagram illustrating the rear panel 122 in FIG. 2(a). The rear panel 122 is circular and forms a reaction surface that captures reaction forces from the variant steering wheel 106 (see FIG. 1(a)) when the cushion 104 is expanded and deployed. A securing area 128 is formed in the center of the rear panel 122 where the inflator 112 (see FIG. 2(a)) is inserted and secured to the module installation surface 109 (see FIG. 4(b)). The cushion 104 expands and develops in a shape of a truncated cone spreading toward the occupant side, and therefore, the rear panel 122 has a narrower area than the front panel 120 (see FIG. 3(a)).

FIG. 3(c) is a diagram illustrating the side panel 124 of FIG. 2(a). The side panel 124 has an arcuate strip shape in a state spread out on a plane. Of two arcs 130 and 132, the arc 130 on the larger diameter side is joined by sewing to the edge of the front panel 120 (see FIG. 3(a)), and the arc 132 on the smaller diameter side is joined by sewing to the edge of the rear panel 122 (see FIG. 3(b)). Longitudinal ends 134a and 134b of the side panels 124 are joined together at the bottom or top of the cushion 104. The side panels 124 are also provided with vent holes 126a and 126b for emitting gas to the outside.

The two arcs 130 and 132 of the side panels 124 are joined to the entire circumference of the edge of the front panel 120 and the entire circumference of the edge of the rear panel 122, respectively. As a result, the cushion 104 of FIG. 2(a) is configured with the side panels 124 intervening throughout between the front panel 120 and the rear panel 122. In other words, the cushion 104 is manufactured in the shape of a three-dimensional bag, with the occupant side surface, the vehicle front side surface, and the side surface formed respectively by a total of three panels, while maintaining ease of sewing and the like.

FIG. 3(d) is a diagram illustrating the cloth member 150 in FIG. 2(a). The cloth member 150 is in the form of a strip and is set to be long enough to reach from the rear panel 122 (see FIG. 2(a)), across the side panels 124, and near the center of the front panel 120. Holes 152a, 152b are provided in the front end side 150a of the cloth member 150 for fastening to the stud bolts 118 of the inflator 112.

FIG. 4 is a diagram illustrating the airbag module 105 in FIG. 2(a) in stowed form. FIG. 4(a) is a perspective view of the airbag module 105 in stowed form. The stowed form is the form when the airbag module is stowed in the variant steering wheel 106 (see FIG. 1(a)). The airbag module 105 is installed on the variant steering wheel 106 in the form of a cushion 104 that is wound, folded or otherwise bundled in a smaller form.

The cloth member 150 is passed from the upper portion of the cushion 104 in stowed form across the cover member 110 side (see FIG. 4(b)) to reach the lower part of the cushion 104. The excess portion of the rear end side 150b is folded at the bottom of the cushion 104.

FIG. 4(b) is a cross-sectional view taken along line A-A of the hub 108 of the variant steering wheel 106 in FIG. 1(b). FIG. 4(b) schematically illustrates how the airbag module 105 in the stowed form of FIG. 4(a) looks when stowed in the hub 108 of the variant steering wheel 106 in FIG. 1(a).

The airbag module 105 is installed on the module installation surface 109 inside the hub 108 of the variant steering wheel 106 using the stud bolts 118 of the inflator 112 (see FIG. 2(a)). The cover member 110 of the hub 108 is mounted at a prescribed location of the variant steering wheel 106 so as to cover the airbag module 105 installed on the module installation surface 109 from the rear side of the vehicle (in other words, the occupant side).

The cover member 110 has a design region 154 where emblems and other decorations are applied to the front side. The design region 154 covers the airbag module 105 on the occupant side. The cover member 110 has a wall part 156 that covers a side surface of the airbag module 105. The wall part 156 is formed on the back side of the design region 154 to enclose the airbag module 105.

The design region 154 of the cover member 110 has a cover door 160 (see FIG. 8) that opens by expansion pressure of the cushion 104. The cover member 110 is configured to use the cover door 160 to release the cushion 104 when the cushion 104 is expanded and deployed.

The airbag module 105 is installed on the module installation surface 109 with a cover member 110 over the cloth member 150, and with the cloth member 150 sandwiched between the cover member 110 and the cushion 104 in stowed form. At this time, the rear end side 150b of the cloth member 150 has reached the lower side of the cushion 104 and is folded between the cushion 104 and the wall part 156 of the cover member 110. According to these configurations, even if the cloth member 150 is subjected to vibrations or the like while stowed, the cloth member 150 can be prevented from shifting in position, and the cloth member 150 can be efficiently deployed to the desired position during expansion and deployment of the cushion 104.

The cushion 104 in stowed form is configured such that the center portion thereof on the occupant side when expanded and deployed contacts the design region 154 of the cover member 110 over the cloth member 150. For example, an apex 158 of the cover member 110 side of the cushion 104 in stowed form in FIG. 4(b) is formed by a portion corresponding to a center P1 in the height direction of the front panel 120 in FIG. 2(b) and the center of the circular front panel 120 in FIG. 3(a). By using the center of the front panel 120 as the apex 158 and having this apex 158 contact and accommodate the design region, the cushion 104 can be efficiently expanded and deployed leading with the center of the front panel 120.

As described with reference to FIG. 2, the cushion 104 is formed into a three-dimensional bag by three panels. The cushion 104 in stowed form of FIG. 4(b) can be formed, for example, by making the center of the front panel 120 of FIG. 2(a) the apex 158, and wrapping or folding the surrounding side panels 124 and the like radially toward this apex 158 and contracting them. This enables efficiently placing the portion of the cushion 104 that is centered on the occupant side of the cushion 104 on the cover member 110 side.

FIG. 5 is a diagram illustrating the cushion 104 of FIG. 2(b) and the occupant 138 in a normal seating position. FIG. 5 illustrates an occupant 138 normally seated in the cushion 104 and seat 102 as viewed from the left side in the vehicle width direction. The cushion 104 can restrain the occupant 138 from the head 140 to the chest 142, and to the abdomen 142 thereof, with the occupant side front panel 120 as the primary restraining surface.

In the present example, as described with reference to FIG. 2(b), the upper portion 104a of the expanded and deployed cushion 104 is configured to be thicker in the vehicle front-rear direction than the lower portion 104b of the cushion 104. In particular, the expanded and deployed cushion 104 is installed in an orientation whereas a boundary L2 between the side panel 124 and the front panel 120 extends upwardly when viewed from the vehicle width direction. In an emergency, the occupant 138 attempting to move forward in the vehicle will make contact at an early stage from the upper portion 104a of the cushion 104. The upper portion 104a of the cushion 104 absorbs a load from the head 140 of the occupant 138 with a thickness thereof.

As described with reference to FIG. 2(b), the width W2 in the vehicle front-rear direction of the lower portion 104b of the cushion 104 is slightly smaller than the width W1 of the upper portion 104a. In an ordinary vehicle, the steering wheel is inclined at an angle of approximately 20° to 25° to the vehicle front side, and a space between the steering wheel and the occupant 138 narrows in the vehicle front-rear direction toward the side of the lower abdomen 144. With the cushion 104 of the present example, the width in the vehicle front-rear direction decreases as the cushion moves toward the lower portion 104b, and therefore, the lower portion 104b easily enters the narrow space between the variant steering wheel 106 and the abdomen 142.

According to the configuration described above, the lower portion 104b of the cushion 104 is sandwiched by the variant steering wheel 106 and the abdomen 142, and thus the shape of the cushion 104 is less likely to collapse. Furthermore, the restraining performance of the upper portion 104a of the cushion 104 with regard to the head 140 of the occupant 138 is also improved as a result. In particular, by stabilizing the orientation of the cushion 104, movement of the head 140 of the occupant 138, such as forward bending and backward retroflexing of the head 140, which can easily cause physical strain, can be prevented.

As described above, the cushion 104 of the present embodiment is configured with a wide area of the front panel 120, which serves as the occupant restraining surface, and a narrow area of the rear panel 122, which captures a reaction force from the variant steering wheel 106. The variant steering wheel 106 has a narrower contact range with the airbag cushion than a conventional circular steering wheel. The rear panel 122 can be set to a dimension according to the variant steering wheel 106 so as to omit portions that do not contact the variant steering wheel 106. This enables reducing the amount of material used to construct the rear panel 122 and to reduce the gas capacity of the cushion 104, thereby contributing to cost reduction.

The cushion 104 of the present embodiment can be set to have a gas capacity in the range of 50 to 60 liters by employing a small diameter rear panel 122. This reduces the number of panels configuring the cushion 104. Therefore, the cushion 104 can be folded or the like into a smaller storing form, and thus can be easily installed on the variant steering wheel 106 with limited storing space.

A gas capacity within the aforementioned range eliminates the need for a high output inflator and an inflator 112 (see FIG. 2(a)), which is as small and inexpensive as possible, can be used. For example, the inflator 112 can use an output in a range of 200 kPa to 230 kPa. An inflator 112 of this output is small and inexpensive, which is beneficial in terms of weight reduction and cost reduction. Reducing the gas capacity of the cushion 104 shortens the time required for the expansion of the cushion 104 to be completed, which leads to the improvement of the occupant restraining performance.

In the present embodiment, an upper end 120a of the front panel 120 of the expanded and deployed cushion 104 is set to be located at a height within a range of ±100 mm of the center of gravity of the head of an adult male. For example, the occupant 138 in FIG. 5 is assumed to be a test dummy doll AM50 (50th percentile male equivalent, 175 cm tall and 78 kg in weight) that mimics a physique that conforms to 50th percentile, or the average U.S. adult male. The upper end 120a of the front panel 120 of the cushion 104 is set to be located at a height within a range of ±100 mm of a center of gravity P3 of the head of this AM50.

The head 140 of the occupant 138, when in contact with the front panel 120 from the chin, forehead, or the like, may cause a rotational movement such as forward retroflexing or backward retroflexing. As described above, forward retroflexing and backward retroflexing of the head 140 are likely to cause a burden on the body due to the structure of the human body. The cushion 104 of the present embodiment contacts the front panel 120 from the center of gravity P3 of the head, restraining the head 140 and preventing excessive movement and reducing the burden on the body.

FIG. 6 is a diagram illustrating the cushion 104 in FIG. 5 and the occupant 138 in a non-normal seating position. FIG. 6(a) illustrates the occupant 138 in a non-normal seating position (commonly referred to as out-of-position) relative to the cushion 104 and seat 102 (see FIG. 5), viewed from the left in the vehicle width direction.

The cushion 104 may approach the head of the occupant from below, for example, when the occupant is leaning out of the seat 102 (see FIG. 5). However, in the airbag module 105 of the present embodiment, the occupant 138 is in direct contact with the cloth member 150 as the cloth member 150 is passed from the upper portion of the cushion 104 to the front panel 120, which is the restraining surface. At this time, the front end side 150a of the cloth member 150 is secured to the stud bolts 118 of the inflator 112 (FIG. 2(a)), while the rear end side 150b of the cloth member 150 is sandwiched between the chest 142 or the like of the occupant 138 and the cushion 104, making it difficult for the cloth member to move. As a result, the cloth member 150 resists the cushion 104 moving to expand and deploy from below, with the front end side 150a and the rear end side 150b in a secured state.

FIG. 6(b) is a diagram of the airbag module 105 and the occupant 138 in FIG. 6(b) as viewed from the front of the vehicle. As described above, the cloth member 150 is sandwiched between the occupant 138 and the cushion 104, making it difficult for the cloth member to move and causing the cloth member to press downwardly on the cushion 104. This causes the cushion 104 to expand in such a way as to avoid the cloth member 150 to the left and right, for example.

According to the configuration described above, the deployment behavior of the cushion 104 toward the head 140 of the occupant 138 can be suppressed, or the load when the cushion 104 contacts the head 140 can be suppressed, preventing the head 140 from being pushed up and retroflexed backward.

In particular, as described with reference to FIG. 4(b), the cloth member 150 is stowed in a state being pressed by the cover member 110 from above, and when the cover door 160 (see FIG. 8) of the cover member 110 is opened, the cushion 104 begins to expand and deploy leading with the cloth member 150. Accordingly, the present embodiment prevents misalignment of the cloth member 150 both while stowed and during expansion and deployment of the cushion 104, and enables efficient deployment of the cloth member 150 at a desired position, or in other words, between the cushion 104 in the process of deployment and the head 140 to the chest 142 of the occupant 138.

The cloth member 150 functions primarily when the cushion 104 starts to expand and deploy in proximity to the occupant 138 (see FIG. 6(a)) in a non-normal seating position, in other words, in the middle of the expansion and deployment of the cushion 104. For example, if the occupant 138 is present in a normal seating position (FIG. 5) and there is distance between the cushion 104 and the occupant 138, the cushion 104 will have completed expansion and deployment and will be greatly inflated. In that state, the cloth member 150 may not be draped over the front panel 120.

The cloth member 150 can be treated to increase frictional resistance in order to make it easier to sandwich the cloth member between the occupant 138 and the cushion 104. For example, the frictional resistance of the cloth member 150 can be increased by applying a silicone coating to the surface of the occupant 138 side of the cloth member 150. Although the cloth member 150 is in the form of a band in the present embodiment, the area thereof can be increased or the width can be narrowed to make the cloth member a cord. These wide area cloth members and thread-like cloth members can also be used to hold the cushion 104 downward by being sandwiched between the cushion 104 and the occupant 138.

An additional configuration of the driver's seat airbag device 100 will be described. FIG. 7 is a diagram illustrating the variant steering wheel 106 of FIG. 1(a) from each direction. FIG. 7(a) is an enlarged view of the variant steering wheel 106 of FIG. 1(a). In the present embodiment, for consideration of safety aspects during expansion and deployment of the cushion 104 (see FIG. 6(a), and the like), and for further improvement of occupant restraint performance, an ingenious design is applied to the cover member 110 of the hub 108.

The cover member 110 is configured to have a cover door 160 formed when the cushion 104 is expanded and deployed. The cover door 160 of the present embodiment comprises a large portion of the design region 154 of the cover member 110 that opens as a single door. The shape of the cover door 160 is defined by a groove part 162 carved into the back of the design region.

FIG. 7(b) is a cross-sectional view taken along line B-B of the hub 108 of the variant steering wheel 106 in FIG. 7(a). As illustrated in FIG. 7(b), a cleavage-inducing groove part 160 is formed into the back of the design region of the cover member 110.

FIG. 8 is a diagram illustrating the cover member 110 in FIG. 7(a) in an opened state. FIG. 8 illustrates the area around the hub 108 of the variant steering wheel 106 omitting the cushion 104. The cover member 110 of the present embodiment comprises one cover door 160 that opens upwardly toward the hub 108 when the groove part 162 (see FIG. 7(b)) is opened by the expansion pressure of the cushion 104. At this time, a hinge 164 is formed in the cover member 110 to connect the body of the cover member 110 to the cover door 160 so that the cover door 160 does not shatter.

The upwardly opening cover door 160 of the present embodiment can also avoid contact with the rim 114 and switch-type objects on either side of and below the hub 108. By reducing the opportunity for the cover door 160 to contact a structure such as the rim 114, it is possible to prevent the cover door 160 from falling off due to impact or the like, thereby further enhancing safety.

The cover door 160 can be used as a supporting surface for the cushion 104. A cover door 160 that opens upwardly can support the upper front side of the cushion 104 and provide a downwardly directed reaction force against the cushion 104 on the occupant side. In other words, a cover door 160 that opens upwardly is less likely to push up the cushion 104 than a cover door that opens downwardly.

As explained with reference to FIG. 5, by expanding and deploying the cushion 104 toward the rear lower side, the cushion 104 can be placed between the variant steering wheel 106 and the abdomen 142 and 144 of the occupant 138, and the cushion 104 can be sandwiched between the variant steering wheel 106 and the abdomen 142 of the occupant 138, thereby making the orientation of the cushion 104 to collapse less readily and improving the restraining performance of the cushion 104 relative to the head 140 of the occupant 138. The behavior of the cushion 104 of moving toward the rearward lower side of the cushion 104 is less likely to contact the head 140 of the occupant 138 from below than the behavior of moving toward the rearward upper side of the cushion 104, thus preventing backward retroflexing of the head 140 of the occupant 138, and other movements of the head 140 that are likely to cause strain. In particular, since the cushion 104 tends to contact the head 140 of an out-of-position occupant 138 described above from below, it is extremely effective to generate rear-downward behavior of the cushion 104.

In order to efficiently open the cover door 160 upwardly, it is also effective to make the lower range of the cover member 110 of the groove part 162 (see FIG. 7(a)) deeper than the upper range. According to this configuration, the groove part 162 induces cleavage first in the lower range before the upper range, and the cleavage speed is also faster, so that the cover door 160 can efficiently generate an upward movement.

As described above, according to the present embodiment, a driver's seat airbag device 100 capable of fully restraining an occupant 138 while giving consideration to safety aspects during expansion and deployment can be achieved.

Modified Example

Modified examples of each of the above-described components are described below. In each of the diagrams FIG. 9 to FIG. 14, the same sign is attached to the same elements as those already described, and the description of the previously mentioned elements are omitted. In the following description, components having the same name as a component already described are assumed to have the same function unless otherwise specified, even if marked with a different sign.

FIG. 9 is a diagram illustrating a first modified example (airbag module 200) and a second modified example (airbag module 220) of the airbag module 105 in FIG. 4(b). FIG. 9(a) illustrates the airbag module 200. In the airbag module 200, the rear end side 150b of the cloth member is inserted and fastened into a gap in the wound or folded cushion 104. This configuration also enables the airbag module 200 in stowed form to prevent the cloth member 150 from being misaligned while stowed and to efficiently deploy the cloth member 150 at a desired position.

FIG. 9(b) illustrates the airbag module 220. In FIG. 9(b), hatching of the cushion 104 is omitted. In the airbag module 220, the cloth member 150 is fastened so that the rear end side 150b is inserted into a gap in the folded cushion 104, and is sandwiched between the cushion 104 and the inflator 112. This configuration also enables the airbag module 220 in stowed form to prevent misalignment of the cloth member 150 while stowed and to efficiently deploy the cloth member 150 at a desired position.

FIG. 10 is a diagram illustrating a third modified example of the airbag module 105 in FIG. 4(b) (airbag module 240). FIG. 10(a) illustrates the airbag module 240, corresponding to FIG. 4(b). A cloth member 242 provided by the airbag module 240 is fastened on both ends to the stud bolts 118a and 118b, and is configured with a fragile part 244 formed at a prescribed location that breaks under the expansion pressure of the cushion 104.

FIG. 10(b) is a diagram illustrating the cloth member 242 corresponding to FIG. 3(d). The cloth member 242 has holes 246a and 246b for fastening to the stud bolts 118 of the inflator 112 not only on a first end side 242a, but also on a second end side 242b. The fragile part 244 is implemented by, for example, providing a fine slit in a broken line at a point near the second end side 242b.

As illustrated in FIG. 10(a), the cloth member 242 has the first end side 242a connected to the stud bolt 118a of the inflator 112, and the second end side 242b connected to the stud bolt 118b across the cover member 110 side of the cushion 104 in stowed form from the first end side 242a. For the cloth member 242, misalignment of the cushion while stowed can be efficiently prevented. As the cushion 104 begins to expand and deploy, the fragile part 244 of the cloth member 242 breaks and the prescribed range of the rear end side 150b becomes a free end state. This configuration also allows the cloth member 242 to be passed over the top of the cushion 104 when the cushion 104 is expanded and deployed. Similar to the cloth member 150 of FIG. 6, the cloth member 242 can also suppress the behavior of the cushion 104 attempting to move toward the head 140 of the occupant 138, or suppress the load when the cushion 104 contacts the head 140, and prevent the head 140 from being pushed up and retroflexed backward.

The fragile part 244 can be implemented by providing a fine slit, but can also be achieved by other configurations. For example, if a single cloth member is achieved by connecting two pieces of cloth with a breakable thread, or by welding them to a breakable degree, the connection or welding portion functions as the fragile part described above.

In addition to a fragile part that can be broken, such as a breaking part 244 [sic], the same function as the breaking part can be achieved by an engaging part that can be released by the expansion pressure of the cushion 104. For example, if a protrusion with a retainer is provided on one of the two pieces of cloth, and a slit or the like is provided on the other to capture the protrusion, and these protrusions and slits are engaged to achieve a single cloth member, the engaging part can be released by the expansion pressure of the cushion 104 to enable deployment of the cloth member.

In each of the cloth members described above, in addition to the configuration in which the end parts are fastened to the stud bolts 118 of the inflator 112, the ends can be connected and secured to the vehicle front side of the cushion 104 by sewing or the like. At that time, for example, even by connecting one end of the cloth member to the cushion 104 by sewing, which is easy to break or unravel, that connection point can be caused to function as the fragile part described above.

FIG. 11 is a diagram illustrating a fourth modified example of the airbag module 105 in FIG. 2(a) (airbag module 260). FIG. 11(a) illustrates the internal structure of the cushion 104 through each panel of the cushion 104 of FIG. 2(a). In the airbag module 260, the cushion 104 is provided with a rectifying cloth 360 as a new internal structure.

The rectifying cloth 360 is a member that directs the gas of the inflator 112 (see FIG. 2(a)) in a particular direction, and is connected to the rear panel 122 at the interior of the cushion 104, covering the portion having the gas discharge port 116 of the inserted inflator 112. The flow-regulating material 360 has an opening portion 364 below the inflator 112 that discharges gas, and small diameter exhaust ports 366a, 366b (see FIG. 11(c)) on side portions that also discharge gas.

FIG. 11(b) is a diagram illustrating the flow-regulating material 360 in FIG. 11(a) from a side. The flow-regulating material 360 is formed in a bag shape by stitching, and a lower side edge is open to form an opening portion 364.

FIG. 11(c) illustrates a state where the flow-regulating material 360 of FIG. 11(b) unstitched and spread out on a plane. The rectifying cloth 360 is provided with an insertion opening 368 in the center through which a portion of the inflator 112 (see FIG. 2(a)) is inserted, and is secured to the module installation surface (see FIG. 4(b)) together with the rear panel 122 by the stud bolts 118 of the inflator 112. Exhaust ports 366a, 366b are provided at two locations on left and right sides to supply gas in the vicinity of the center of the cushion 104. The aperture 364 is formed to a larger diameter than the exhaust ports 366a and 366b and allows more gas to pass through than the exhaust ports 366a and 366b.

With the rectifying cloth 360 described above, the gas supplied from the inflator 112 is preferentially supplied to the lower portion 104b of the cushion 104 (FIG. 5) through the aperture 364. As a result, the cushion 104 expands and deploys preferentially from the lower 104b side. According to this configuration, the cushion 104 allows the lower portion 104b to enter between the variant steering wheel 106 and the abdomen 142 of the occupant 138 at an early stage and to be sandwiched between the variant steering wheel 106 and the abdomen 142.

FIG. 12 is a diagram illustrating a fifth modified example of the airbag module 105 in FIG. 2(a) (airbag module 280). FIG. 12(a) illustrates an airbag module 280, corresponding to FIG. 2(a). The cushion 282 provided with airbag module 280 differs in configuration from that of cushion 104 of FIG. 2(a) in that two panel members, front panel 284, and rear panel 286, are provided, in other words, side panel 124 is omitted. The cloth member 150 is also provided for the cushion 282.

FIG. 12(b) is a diagram illustrating the front panel 284 of FIG. 12(a). The front panel 284 is circular in shape. FIG. 12(c) is a diagram illustrating the rear panel 286 of FIG. 12(a). The rear panel 286 is circular and is formed to approximately the same dimensions as the front panel 284. The cushion 282 of FIG. 12(a) can be formed by joining the edge of the front panel 284 to the edge of the rear panel 286.

In the airbag module 280 of this configuration (see FIG. 12(a)), by applying the cloth member 150 over the upper portion of the cushion 282, similar to the airbag module 105 of FIG. 6, behavior of the cushion 282 during deployment of attempting to move toward the head 140 of the occupant 138 can be suppressed, or the load when the cushion 282 contacts the head 140 can be suppressed; thus preventing the head 140 from being pushed up and retroflexed backward. In the airbag module 280, as in the airbag module 105 of FIG. 4(b), by using a stowed form with the center of the front panel 284 as the apex, the portion of the cushion 282 that is centered on the occupant side can be positioned on the cover member 110 side.

FIG. 13 is a diagram illustrating a sixth modified example of the airbag module 105 in FIG. 2(a) (airbag module 300). FIG. 13(a) illustrates an airbag module 300, corresponding to FIG. 2(a). Similar to the cushion 282 of FIG. 12(a), a cushion 302 provided with the airbag module 300 is composed of two panel members, a front panel 304 and a rear panel 306, but differs from the cushion 282 in that the front panel 304 and the rear panel 306 are rectangular.

FIG. 13(b) is a diagram illustrating the front panel 304 of FIG. 13(a). The front panel 304 is formed in a near square shape. FIG. 13(c) is a diagram illustrating the rear panel 306 of FIG. 13(a). The rear panel 306 is also nearly square in shape and is formed to approximately the same dimensions as the front panel 304. When forming the cushion 302 of FIG. 13(a), one of the front panels 304 or rear panels 306 is tilted at about 45° to the other and joined edge to edge with each other.

In the airbag module 300 of these configurations (see FIG. 13(a)), by applying the cloth member 150 over the upper portion of the cushion 302, similar to the airbag module 105 of FIG. 6, it is possible to suppress the behavior of the cushion 302 during deployment attempting to move toward the head 140 of the occupant 138, or suppress the load when the cushion 302 contacts the head 140, and prevent the head 140 from being pushed up and retroflexed backward. In the airbag module 300, as in the airbag module 105 of FIG. 4(b), by using a stowed form with the center of the front panel 304 as the apex, the portion of the cushion 302 that is centered on the occupant side can be positioned on the cover member 110 side.

FIG. 14 is a diagram illustrating a first modified example (cover member 400) and a second modified example (cover member 420) of the cover member 110 in FIG. 7(a). These cover members 400 and 420 are different in configuration from the cover member 110, regarding the shape of the cover door.

FIG. 14(a) is a diagram illustrating a cover member 400. The cover member 400 comprises two cover doors 404a and 404b on the left and right sides formed by a groove part 402. The cover doors 404a and 404b are formed by bisecting a design region 408 of the cover member 400 into left and right sides, such that an emblem 406 is included in the left side cover door 404a. The cover member 400 is formed with hinges 410a and 410b that connect the body of the cover 400 to the cover doors 404a and 404b so that the cover doors 404a and 404b do not fly away.

In the cover member 400, when the groove part 402 is opened by the expansion pressure of the cushion 104 (see FIG. 7(b)), the two cover doors 404a and 404b respectively open upwards. The upwardly-opening cover doors 404a and 404b are less likely to push up the cushion 104 than downwardly-opening cover doors, and provide a downward reaction force to the cushion 104, thereby suppressing the deployment behavior of the cushion 104 attempting to move toward the head 140 of the occupant 138 (see FIG. 6).

FIG. 14(b) is a diagram illustrating the cover member 420. The cover member 420 also comprises two cover doors 424a and 424b that bisect the design region 426 into left and right sides by a groove part 422. The cover doors 424a and 424b are configured to open toward each of the left and right diagonally upward directions when viewed from the center of the hub 108.

Hinges 444a and 444b are formed at respective locations diagonally upwardly away from the center of the hub 108. Even the cover doors 424a and 424b, which open diagonally upward from right to left, provide a downward reaction force against the cushion 104, so that it is difficult to push up the cushion 104 compared to a downwardly-opening cover door, thereby suppressing the deployment behavior of the cushion 104 attempting to move toward the head 140 of the occupant 138 (see FIG. 6).

FIG. 15 is a diagram illustrating a seventh modified example (airbag module 500) and an eighth modified example (airbag module 520) of the airbag module 105 in FIG. 4(b). FIG. 15(a) illustrates an airbag module 500 of the seventh modified example. The front end side 150a of the cloth member 150 can also be connected to the wall part 156 of the cover member, for example, as a part that makes up the variant steering wheel 106. The front end side 150a of the cloth member 150 can be connected to the wall part 156 by use of a fastener such as a rivet 502 or by welding, for example, when the wall part 156 is made of resin. This configuration also allows the cloth member 150 to be applied to the top of the expanding and deploying cushion 104.

FIG. 15(b) illustrates an airbag module 520 of the eighth modified example. The front end side 150a of the cloth member 150 can also be connected to the module installation surface 109, for example, as a part that makes up the variant steering wheel 106. The front end side 150a of the cloth member 150 can be connected to the module installation surface 109 using a bolted bracket 522. With the bracket 522, whether the module installation surface 109 is made of metal or resin, providing support is feasible. When the module installation surface 109 is made of resin, the front end side 150a of the cloth member 150 can be connected to the module installation surface 109 by welding in addition to the bracket 522. This configuration also allows the cloth member 150 to be applied to the top of the expanding and deploying cushion 104.

FIG. 16 is a diagram illustrating a ninth modified example (airbag module 540) and a tenth modified example (airbag module 560) of the airbag module 105 in FIG. 4(b). FIG. 16(a) illustrates an airbag module 540 of the ninth modified example. The front end side 150a of the cloth member 150 can also be sandwiched as a part comprising the variant steering wheel 106, for example, at a point between the cover member 110 and a part adjacent to this cover member 110, for example, at the edge of the module installation surface 109. This configuration also allows the front end side 150a of the cloth member 150 to be connected to the variant steering wheel 106, and the cloth member 150 to be applied to the upper portion of the cushion 104 that is expanded and deployed.

FIG. 16(b) illustrates an airbag module 540 of the tenth modified example. The front end side 150a of the cloth member 150 can also be connected to the design region 154 of the cover member 110, for example, as a part that makes up the variant steering wheel 106. The front end part 150a of the cloth member 150 can be connected to the design region 154 by, for example, welding or the like to the design region 154 together with a prescribed emblem 562.

As described with reference to FIG. 8, the cover member 110 comprises one cover door 160 that opens upwardly. This cover door 160 is formed by including an emblem 562. Accordingly, when the cushion 104 is expanded, the front end side 150a of the cloth member 150 is positioned above the cushion 104. Therefore, this configuration also allows the cloth member 150 to be suspended on top of the expanding cushion 104. Otherwise, the front end part 150a of the cloth member 150 can be connected not only to the area that will be the cover door 160, but also to the area above the cover door 160 in the design region 154 by welding or riveting. According to this configuration, regardless of the direction in which the cover door 160 is opened, the front end side 150a of the cloth member 150 can be positioned above the cushion 104, and the cloth member can be suspended on the upper portion of the cushion to be expanded and deployed.

FIG. 17 is a diagram illustrating an eleventh modified example of the airbag module 105 in FIG. 4 (airbag module 600). FIG. 17(a) is a perspective view of the airbag module 600 in stowed form, corresponding to FIG. 4(a). In the present modified example, the configuration differs from the above examples in that a folding part 602 is provided in the middle of the cloth member 150. The folding part 602 is formed by folding a midway point of the longitudinal side of the cloth member 150 in a pleated manner.

FIG. 17(b) is a cross-sectional view of the airbag module 600 corresponding to FIG. 4(b). As illustrated in FIG. 17(b), the folding part 602 is folded so as to be sandwiched between the apex 158 of the cushion 104 and the design region 154 of the cover member 110. This configuration allows the cloth member 150 while stowed to be shortened for the airbag module 600 while preventing the cloth member 150 from shifting position while stowed. In addition, with the folding part 602 overlapping the apex 158 of the cushion 104, the cloth member 150 can be smoothly deployed by suitably releasing the folding part 602 as the cushion 104 expands and deploys.

FIG. 18 is a diagram illustrating a twelfth modified example of the airbag module 105 in FIG. 4 (airbag module 620). FIG. 18(a) is a perspective view of the airbag module 620 in stored form, corresponding to FIG. 4(a). In the present modified example, the configuration differs from the above examples in that the cloth member 150 is provided with a temporary fastening part 622 in addition to the folding part 602. The temporary fastening part 622 is provided for temporarily fastening the folding part 602.

FIG. 18(b) is a cross-sectional view of the airbag module 620 corresponding to FIG. 4(b). The temporary fastening part 622 is formed so as to enable being released by the expansion pressure of the cushion 104. For example, the temporary fastening part 622 is formed by sewing that can be broken by the expansion pressure of the cushion 104. The temporary fastening part 622, together with the folding part 602, is sandwiched between the apex 158 of the cushion 104 and the design region 154 of the cover member 110. Therefore, the temporary fastening part 622 can easily apply force during the expansion and deployment of the cushion 104 and can be smoothly released.

With the configuration of the airbag module 620 described above, the cloth member 150 can be shortened and prevented from being displaced while stowed by the folding portion 602 and the temporary fastening part 622, while the cloth member 150 can be smoothly deployed by releasing the temporary fastening part 622 during expansion and deployment of the cushion 104. The temporary fastening part 622 is not limited to breakable sewing, but can also be realized by, for example, bonding or heat welding that can be peeled off by the expansion pressure of the cushion 104.

FIG. 19 is a diagram illustrating a thirteenth modified example (airbag module 640) of the airbag module 105 in FIG. 2(*a*). FIG. 19(*a*) is a perspective view of the airbag module 640 corresponding to FIG. 2(*a*). In this modified example, the configuration differs from the above examples in that the static frictional force on the occupant side of a cloth member 642 is enhanced to make slipping difficult.

The cloth member 642 has a configuration in which the static coefficient of friction of the surface on the occupant side is greater than the static coefficient of friction of the surface on the cushion side. For example, the cloth member 642 has a resin coated surface 644 on the occupant side. The resin-coated surface 644 is coated with silicone (as an example of a type of resin), and has a large static frictional force against the occupant 138 (FIG. 6(*a*)), causing slipping against the occupant 138 to occur less readily. Accordingly, with the airbag module 640, when the cloth member 642 contacts the occupant 138, the cloth member 642 and the cushion 104 are prevented from slipping off the occupant 138, and the cloth member 642 appropriately exerts the function of preventing the head 140 of the occupant 138 from being pushed up, while enabling the cushion 104 to fully restrain the occupant 104 [sic].

FIG. 19(*b*) shows the test results of evaluating cloth members with different static friction coefficients. The tests were performed on a total of 11 samples from A to K. Each cloth member sample has a different amount of silicon applied. The tests were performed on the measurement of the coefficient of static friction, the evaluation of the injury value of the occupant 138 (see FIG. 6(*a*)) in a non-normal seating position (out of position (OOP)), and the evaluation of the deployment behavior of the cushion 104. As explained with reference to FIG. 6(*a*), the non-normal seating position assumes that the occupant 138 is leaning out of the seat.

The measurement of the coefficient of static friction of the cloth member was carried out in accordance with ISO 8295 by preparing two sample pieces of the same type of cloth member, securing one side to the test table, and strapping the other side to a sliding piece of the testing machine, and sliding the sliding piece in motion on the test table. The two sample pieces of the cloth member were fixed to the test table and the slip piece, respectively, so that the occupant-side surfaces were in contact with each other. The injury values and deployment behavior of the occupant 138 were also analyzed using computer simulations.

As shown in FIG. 19(*b*), the OOP injury values performed well on and after sample D, where the static friction coefficient was greater than 1. This is because when the static friction coefficient of the cloth member is less than 1, when the cloth member is pressed against the abdomen 142 of the occupant 138 (see FIG. 6(*a*)) while the cushion 104 expands and deploys, the cloth member slips and the cushion 104 expands upward as is, pushing up the chin of the occupant 138.

The deployment behavior of the cushion 104 performed well on and before sample I. This was because when the coefficient of static friction of the cloth member was higher than a certain level, excessive static frictional force was generated between the cloth member and the cover member 110 (FIG. 4(*b*)) when the cushion 104 expanded and deployed, and the cloth member altered the deployment behavior of the cushion 104.

From the above, the coefficient of static friction on the occupant side of the cloth member was confirmed to be favorable when within the range of values from 1 to 6. If the cloth member is within this range, the cushion 104 can fully restrain the occupant 138 while preventing slipping way from the occupant 138 upon contact with the occupant 138 (see FIG. 6(*a*)), and suitably preventing the head 140 from being pushed up and retroflexed backward by suppressing the deployment behavior of the cushion 104 toward the head 140 of the occupant 138.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used in a driver's seat airbag device for restraining an occupant in an emergency.

the invention claimed is:

1. A driver's seat airbag device comprising:
a vehicle steering wheel; and
an airbag module stowed in the steering wheel containing an inflator and an airbag cushion, wherein
the steering wheel has a module installation surface on which the airbag module is installed and a cover member that covers the airbag module installed on the module installation surface;
the cover member is formed with one or a plurality of cover doors that open upon receiving expansion pressure from the airbag cushion;
the airbag module further includes a cloth member that is suspended on the upper portion of the airbag cushion upon expansion and deployment, the cloth member being connected on the front end side to the inflator, the vehicle front side of the airbag cushion, or a prescribed location of the steering wheel, and the rear end is a free end, wherein the cloth member is positioned and configured to contact an occupant during deployment to sandwich the cloth member between the occupant and the airbag cushion and to resist expansion of the airbag cushion during deployment;

in the airbag module, the airbag cushion is put into a stowed form, such as being wound up or folded, the cloth member is suspended across the cover member side of the airbag cushion in stowed form; and the cover member is laid on top of the cloth member; and in this state where the cloth member is sandwiched between the cover member and the airbag cushion in stowed form, the airbag module is installed on the module installation surface.

2. The driver's seat airbag device according to claim 1, wherein the cover member has a design region that covers the airbag module and a wall part extending from the design region surrounding the airbag module, and one or a plurality of cover doors are formed in the design region.

3. The driver's seat airbag device according to claim 2, wherein the airbag module is installed on the airbag module installation surface in a state where the cloth member reaches the lower side of the airbag cushion in stowed form and is folded between the airbag cushion and the wall part of the cover member.

4. The driver's seat airbag device according to claim 2, wherein the airbag module is installed on the airbag module installation surface in a state where the cloth member reaches the lower side of the airbag cushion in stowed form and is wound or folded together with said airbag cushion.

5. The driver's seat airbag device according to claim 2, wherein the airbag module is installed on the airbag module installation surface in a state where a midway point of the cloth member is folded between the airbag cushion and the design region of the cover member.

6. The driver's seat airbag device according to claim 5, wherein the airbag module has a temporary fastening part that temporarily fastens the folded point of the cloth member, and the temporary fastening part is release-able by expansion pressure of the airbag cushion.

7. The driver's seat airbag device according to claim 6, wherein the temporary fastening part is sewing that is breakable by expansion pressure of the airbag cushion.

8. The driver's seat airbag device according to claim 2, wherein the prescribed location of the steering wheel includes the wall part of the cover member.

9. The driver's seat airbag device according to claim 2, wherein the prescribed location of the steering wheel includes the module installation surface.

10. The driver's seat airbag device according to claim 2, wherein the prescribed location of the steering wheel includes a location between the cover member and the location adjacent to the cover member, and the front end side of the cloth member is sandwiched between said locations.

11. The driver's seat airbag device according to claim 2, wherein the one or plurality of cover doors open upwardly and the prescribed location of the steering wheel includes the cover door or a region above the cover door in the design region.

12. The driver's seat airbag device according to claim 1, wherein the one or plurality of cover doors open upwardly.

13. The driver's seat airbag device according to claim 1, wherein the airbag cushion has a restraining surface capable of restraining the chest of an occupant, and the cloth member is applied from the upper portion of the expanding and deploying airbag cushion over the restraining surface.

14. The driver's seat airbag device according to claim 1, wherein the upper portion of the expanded and deployed airbag cushion is thicker in the vehicle front-rear direction than the lower portion of said airbag cushion.

15. The driver's seat airbag device according to claim 1, wherein a portion of the inflator is inserted into the airbag cushion and a prescribed gas discharge port is formed in said portion, where the airbag cushion has a rectifying cloth covering a portion of the inserted inflator, and where the rectifying cloth has an aperture below the portion of the inflator.

16. The driver's seat airbag device according to claim 1, wherein, when expanded and deployed, a portion of the airbag cushion in stowed form that is centered on the occupant side contacts the cover member over the cloth member.

17. The driver's seat airbag device according to claim 16, wherein the airbag cushion in stowed form is contracted by winding or folding the airbag cushion radially from the periphery toward the apex, with the apex being centered on the occupant side.

18. The driver's seat airbag device according to claim 1, the steering wheel comprising:
a hub that includes the module installation surface and the cover member; and
a rim to be gripped by the occupant; wherein
the rim has a shape in which an area above the hub is partially omitted or in which a part located above said hub is closer to the hub side than a part located to the left or right of the hub.

19. The driver's seat airbag device according to claim 1, wherein the cloth member has a static coefficient of friction of the surface on the occupant side that is greater than the static coefficient of friction of the surface on the airbag cushion side.

20. The driver's seat airbag device according to claim 1, wherein the cloth member is coated with a prescribed resin on the surface of the occupant side.

21. A driver's seat airbag device comprising:
a vehicle steering wheel; and
an airbag module stowed in the steering wheel including an inflator and an airbag cushion, wherein
the steering wheel has a module installation surface on which the airbag module is installed and a cover member that covers the airbag module installed on the module installation surface;
the cover member is formed with one or a plurality of cover doors that open upon receiving expansion pressure from the airbag cushion;
the airbag module further includes a cloth member suspended on the airbag cushion that expands and deploys, the airbag cushion is put into a stowed form, such as being wound up or folded, the cloth member is suspended across the cover member side of the airbag cushion in stowed form, and the cover member is laid on top of the cloth member;
in this state where the cloth member is sandwiched between the cover member and the airbag cushion in stowed form, the airbag module is installed on the module installation surface;
regarding the cloth member, the first end side is connected to the inflator, the vehicle front side of the airbag cushion, or a prescribed location on the steering wheel, and the second end side crosses from the first end side over the cover member side of the airbag cushion in stowed form and is connected to the inflator or the vehicle front side of the airbag cushion; and
a prescribed location on the second end side of the cloth member is formed with an engaging part that can be released upon expansion pressure from the airbag cushion or a fragile part that can be broken upon expansion pressure from the airbag cushion such that the cloth member is configured to be positioned in a location adjacent to an occupant side of the airbag cushion opposite from the vehicle front side of the airbag cushion during deployment to contact a driver positioned in the driver's seat and to thereby suppress expansion of the airbag cushion.

22. The driver's seat airbag device according to claim 21, wherein the cover member has a design region that covers the airbag module and a wall part extending from the design region surrounding the airbag module, and one or a plurality of cover doors are formed in the design region.

* * * * *